(12) United States Patent
Ishikawa

(10) Patent No.: US 10,754,130 B2
(45) Date of Patent: Aug. 25, 2020

(54) ZOOM LENS, OPTICAL APPARATUS AND METHOD FOR MANUFACTURING THE ZOOM LENS

(71) Applicant: Nikon Corporation, Minato-ku, Tokyo (JP)

(72) Inventor: Takahiro Ishikawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 196 days.

(21) Appl. No.: 16/071,348

(22) PCT Filed: Jan. 30, 2017

(86) PCT No.: PCT/JP2017/003102
§ 371 (c)(1),
(2) Date: Jul. 19, 2018

(87) PCT Pub. No.: WO2017/131223
PCT Pub. Date: Aug. 3, 2017

(65) Prior Publication Data
US 2020/0088978 A1    Mar. 19, 2020

(30) Foreign Application Priority Data

Jan. 28, 2016   (JP) ................................. 2016-014315

(51) Int. Cl.
*G02B 15/173*   (2006.01)
*G02B 15/14*    (2006.01)
*G02B 15/28*    (2006.01)

(52) U.S. Cl.
CPC ..... *G02B 15/145121* (2019.08); *G02B 15/28* (2013.01)

(58) Field of Classification Search
CPC .... G02B 7/102; G02B 15/173; G02B 15/177; G02B 13/009; G02B 15/14

(Continued)

(56) References Cited

U.S. PATENT DOCUMENTS 6,483,648 B1   11/2002  Yamanashi
2007/0229968 A1  10/2007  Satori et al.
(Continued)

FOREIGN PATENT DOCUMENTS

JP   2001-091833 A   4/2001
JP   2007-279587 A   10/2007
(Continued)

OTHER PUBLICATIONS

Office Action dated Aug. 6, 2019 in Japanese Patent Application No. 2017-563887.
(Continued)

*Primary Examiner* — Mohammed A Hasan
(74) *Attorney, Agent, or Firm* — SGPatents PLLC

(57) ABSTRACT

A zoom lens comprises, in order from an object: a first lens group (G1) having a positive refractive power, a second lens group (G2) having a negative refractive power, a third lens group (G3) having a positive refractive power, a fourth lens group (G4) having a negative refractive power, and a fifth lens group (G5) having a positive refractive power, in which: intervals between adjacent lens groups change and the first lens group (G1), the second lens group (G2), the third lens group (G3), and the fourth lens group (G4) move upon zooming from a wide angle end state to a telephoto end state; and following conditional expressions are satisfied: $1.80<f1/(fw \times ft)^{1/2}<2.60$; and $0.75<-f4/(fw \times ft)^{1/2}<1.20$, where, f1 denotes a focal length of the first lens group, f4 denotes a focal length of the fourth lens group, fw denotes a focal length of the zoom lens in the wide angle end state, and ft denotes a focal length of the zoom lens in the telephoto end state.

25 Claims, 22 Drawing Sheets

(58) Field of Classification Search
USPC .......................................................... 359/695
See application file for complete search history.

(56) References Cited

U.S. PATENT DOCUMENTS

| | | | |
|---|---|---|---|
| 2008/0304161 A1 | 12/2008 | Souma | |
| 2009/0109548 A1 | 4/2009 | Kimura | |
| 2009/0116120 A1 | 5/2009 | Saruwatari | |
| 2009/0290232 A1 | 11/2009 | Hagiwara | |
| 2010/0220398 A1* | 9/2010 | Ohtake | G02B 15/173 359/683 |
| 2011/0109978 A1* | 5/2011 | Yamada | G02B 15/17 359/684 |
| 2011/0261232 A1 | 10/2011 | Touchi et al. | |
| 2011/0261250 A1 | 10/2011 | Touchi et al. | |
| 2012/0113516 A1* | 5/2012 | Kimura | G02B 27/646 359/557 |
| 2012/0194730 A1 | 8/2012 | Morooka et al. | |
| 2013/0002934 A1 | 1/2013 | Bito | |
| 2013/0242169 A1 | 9/2013 | Okubo | |
| 2014/0043692 A1 | 2/2014 | Mogi | |
| 2015/0062385 A1 | 3/2015 | Fujisaki | |
| 2015/0138400 A1 | 5/2015 | Ito | |
| 2015/0138401 A1 | 5/2015 | Fujisaki | |

FOREIGN PATENT DOCUMENTS

| | | |
|---|---|---|
| JP | 2008-304708 A | 12/2008 |
| JP | 2009-109630 A | 5/2009 |
| JP | 2009-115958 A | 5/2009 |
| JP | 2009-282398 A | 12/2009 |
| JP | 2011-232542 A | 11/2011 |
| JP | 2011-232543 A | 11/2011 |
| JP | 2012-159579 A | 8/2012 |
| JP | 2012-220920 A | 11/2012 |
| JP | 2013-044755 A | 3/2013 |
| JP | 2013-190741 A | 9/2013 |
| JP | 2013-228500 A | 11/2013 |
| JP | 2014-035418 A | 2/2014 |
| JP | 2015-045729 A | 3/2015 |
| JP | 2015-084039 A | 4/2015 |
| JP | 2015-099213 A | 5/2015 |
| JP | 2015-102591 A | 6/2015 |
| JP | 2015-102691 A | 6/2015 |
| JP | 2015-125327 A | 7/2015 |
| JP | 2015-179189 A | 10/2015 |
| JP | 2016-014803 A | 1/2016 |
| JP | 2017-116609 A | 6/2017 |
| JP | 2017-116610 A | 6/2017 |
| WO | WO 2012/101958 A1 | 8/2012 |
| WO | WO 2014/115470 A1 | 7/2014 |

OTHER PUBLICATIONS

English Translation of International Search Report from International Patent Application No. PCT/JP2017/003102, dated Apr. 25, 2017.

English Translation of International Preliminary Report on Patentability from International Patent Application No. PCT/JP2017/003102, dated Aug. 9, 2018.

Office Action dated Mar. 4, 2020, in Chinese Patent Application No. 201780008776.X.

Office Action dated Apr. 7, 2020, in Japanese Patent Application No. 2017-563887.

* cited by examiner

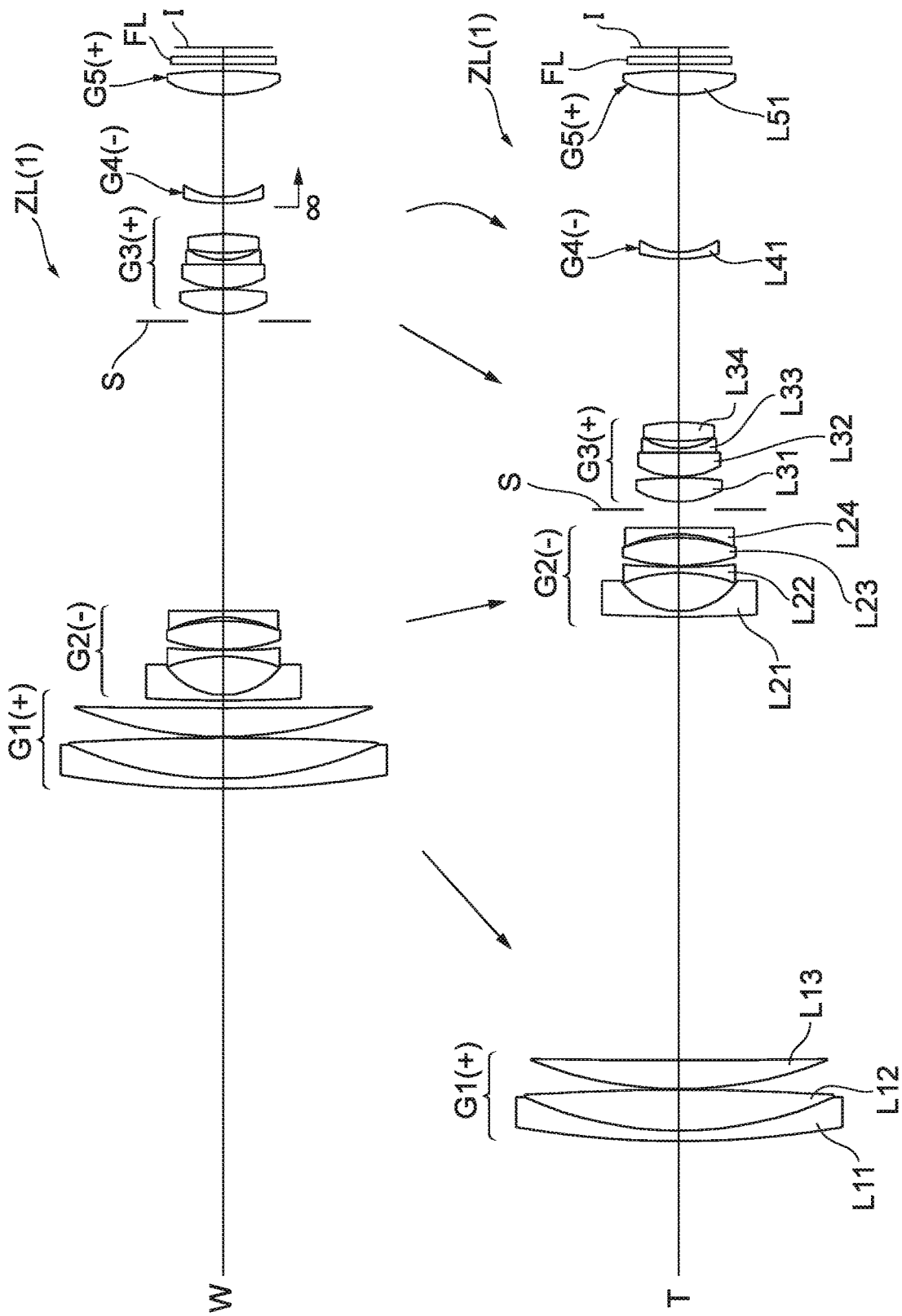

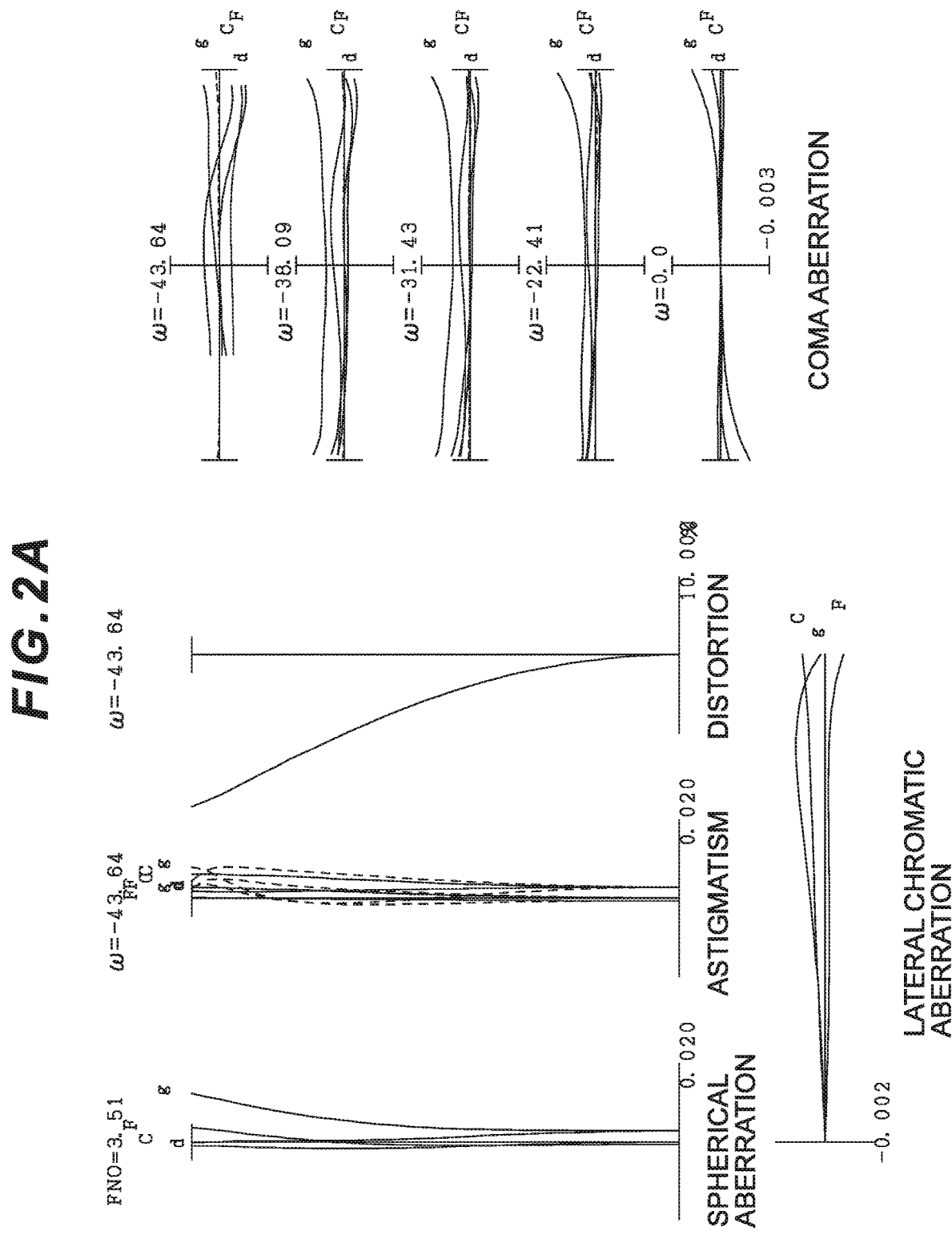

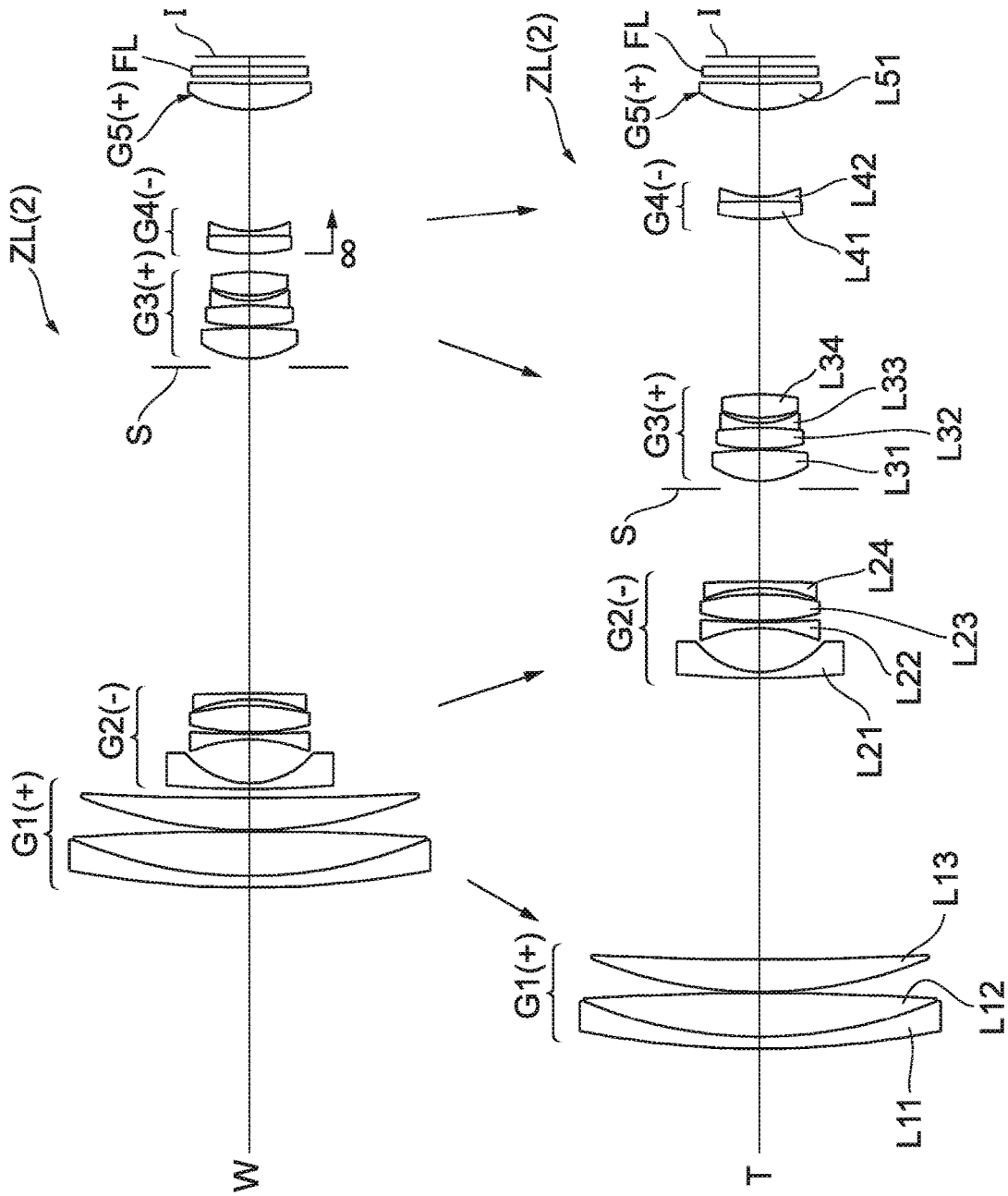

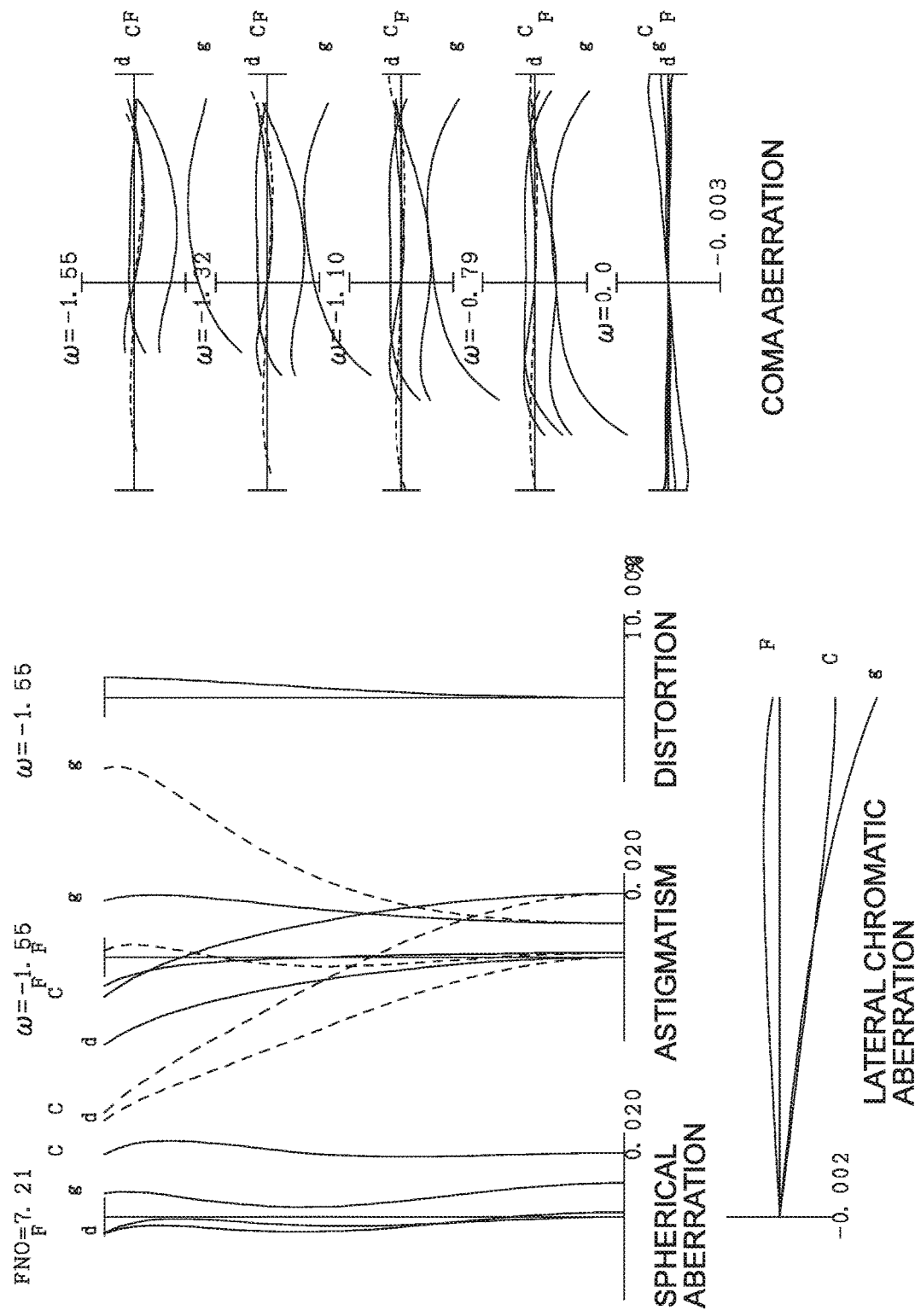

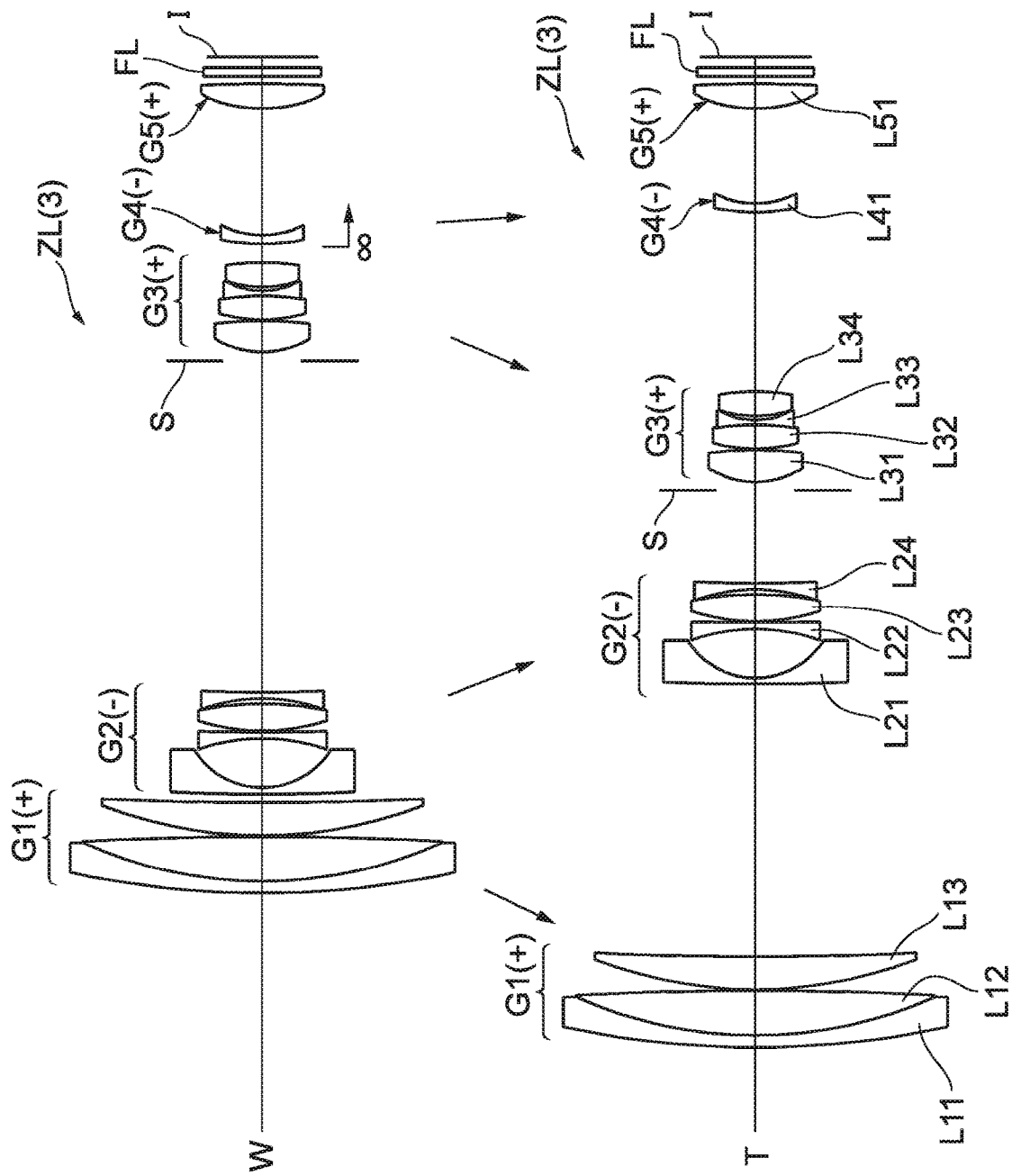

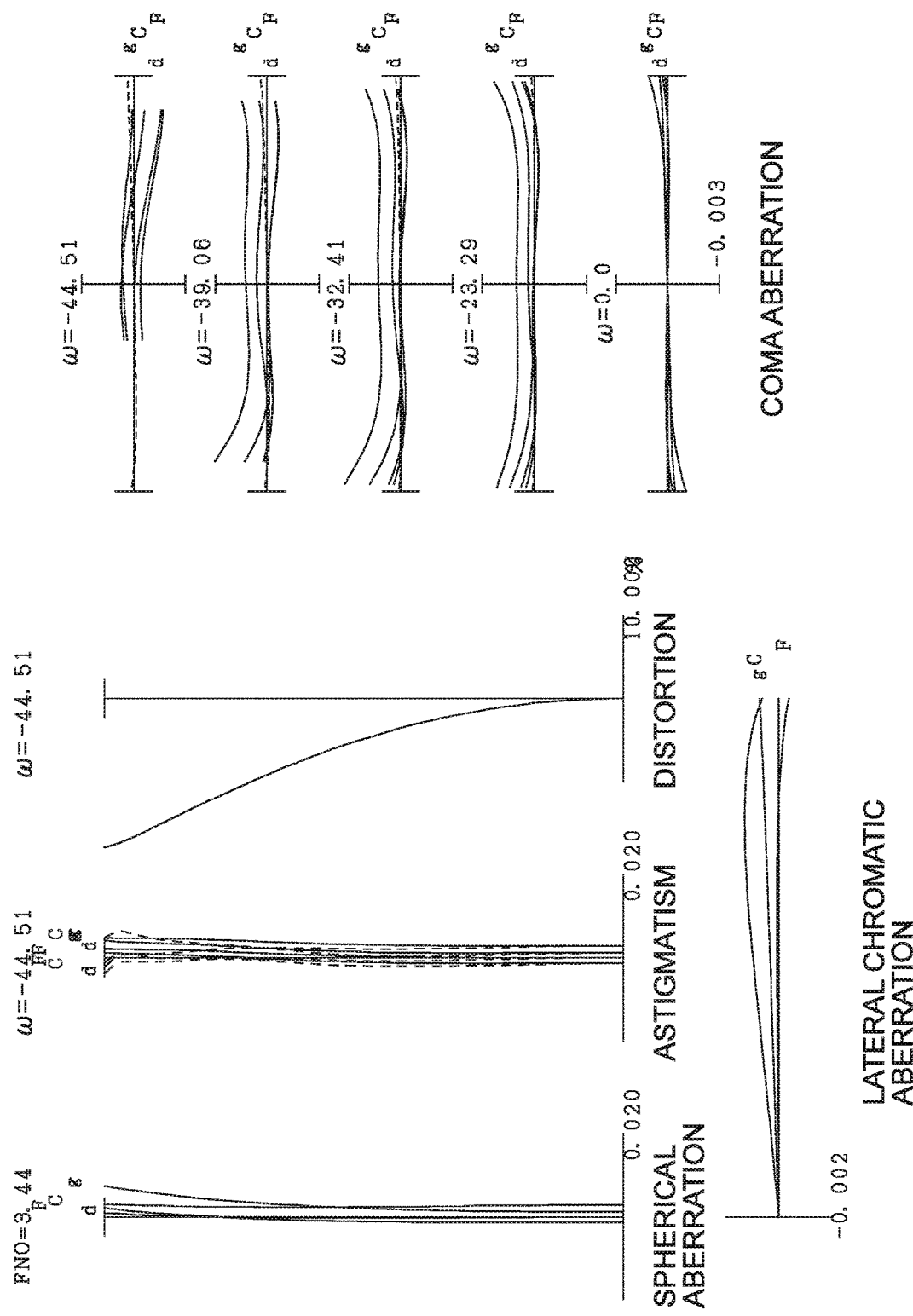

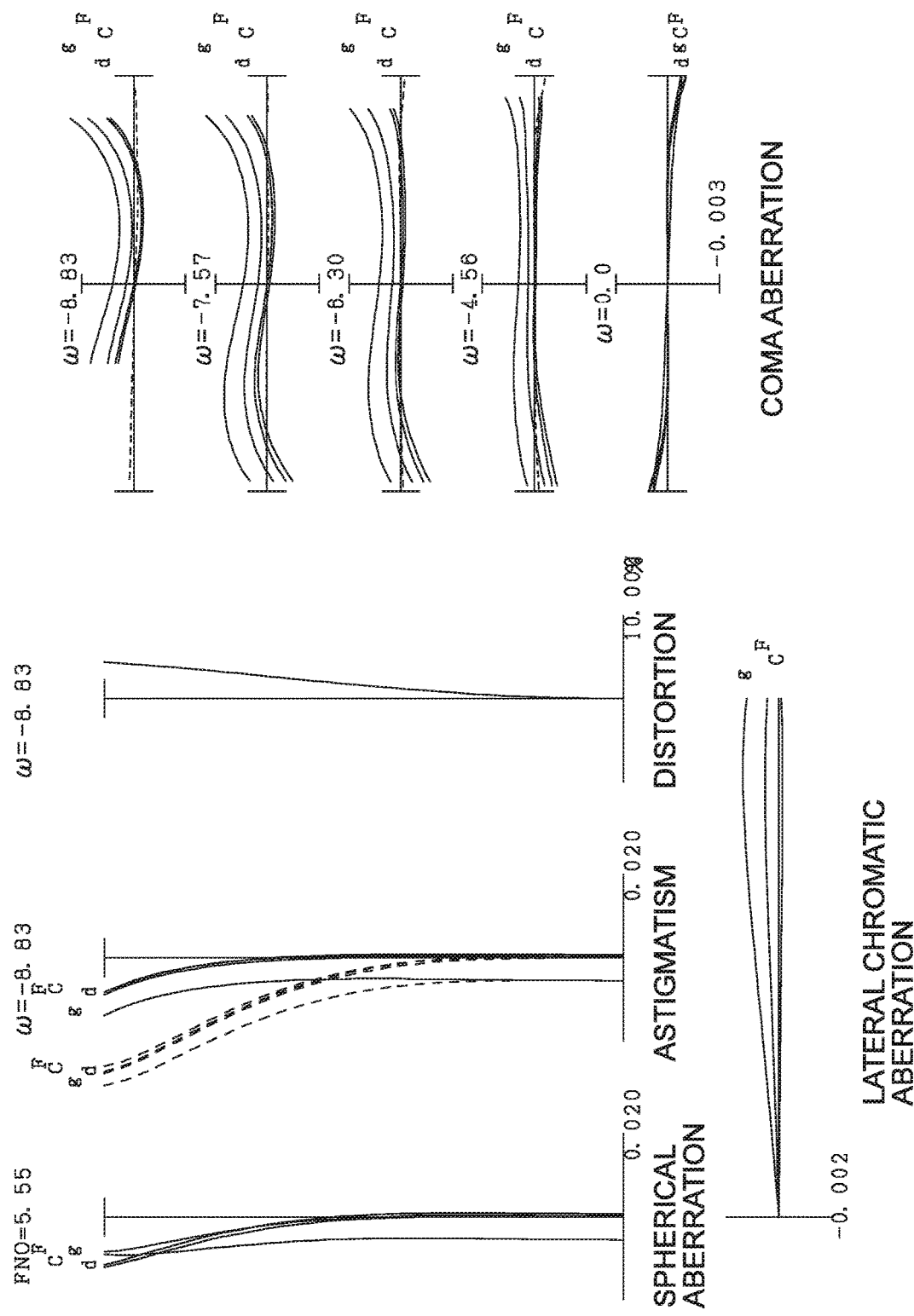

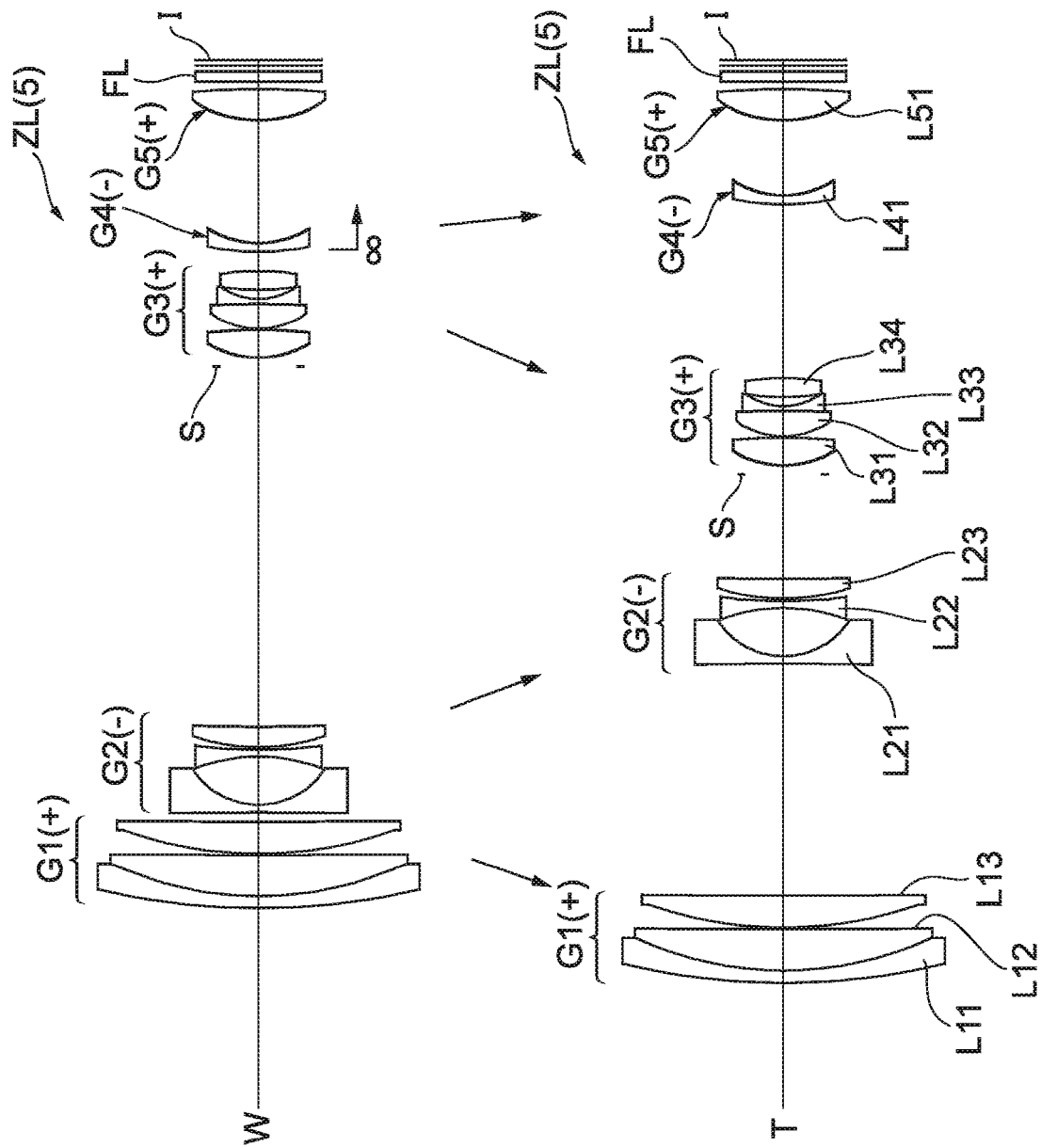

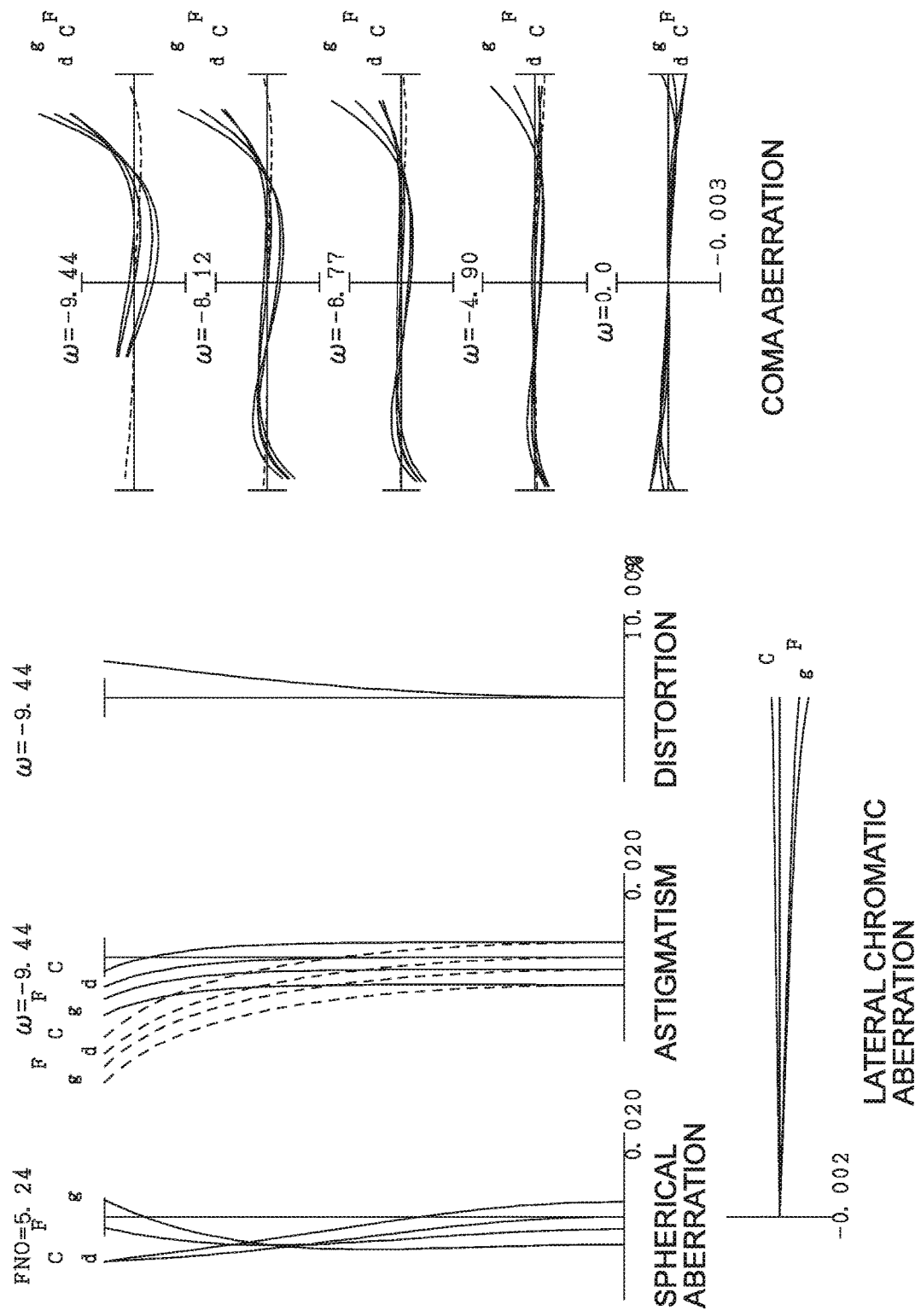

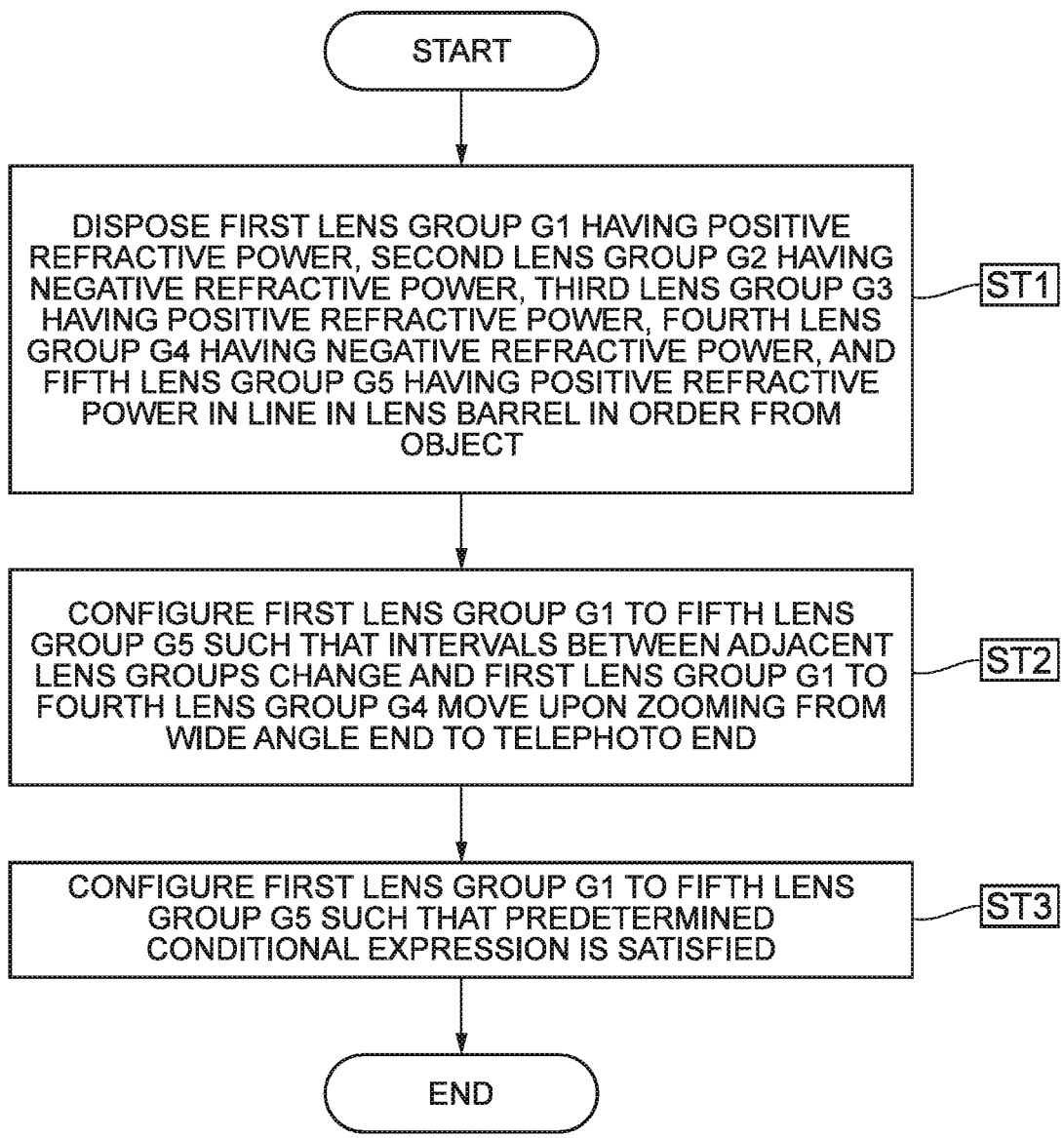

ZOOM LENS, OPTICAL APPARATUS AND METHOD FOR MANUFACTURING THE ZOOM LENS

TECHNICAL FIELD

The present invention relates to a zoom lens, an optical apparatus using the zoom lens, and a method for manufacturing the zoom lens.

TECHNICAL BACKGROUND

Hitherto, there has been proposed a zoom lens consisting of, in order from an object, a first lens group having a positive refractive power, a second lens group having a negative refractive power, a third lens group having a positive refractive power, a fourth lens group having a negative refractive power, and a fifth lens group having a positive refractive power, in which zooming is performed by moving the lens groups (for example, see Patent Document 1).

PRIOR ARTS LIST

Patent Document

Patent Document 1: Japanese Laid-Open Patent Publication No. 2013-228500(A)

SUMMARY OF THE INVENTION

A zoom lens according to a first invention comprises, in order from an object: a first lens group having a positive refractive power; a second lens group having a negative refractive power; a third lens group having a positive refractive power; a fourth lens group having a negative refractive power; and a fifth lens group having a positive refractive power, in which: intervals between adjacent lens groups change and the first lens group, the second lens group, the third lens group, and the fourth lens group move upon zooming from a wide angle end state to a telephoto end state; and following conditional expressions (1) and (2) are satisfied.

$$1.80 < f1/(fw \times ft)^{1/2} < 2.60 \quad (1)$$

$$0.75 < -f4/(fw \times ft)^{1/2} < 1.20 \quad (2)$$

where, f1 denotes a focal length of the first lens group,
f4 denotes a focal length of the fourth lens group,
fw denotes a focal length of the zoom lens in the wide angle end state, and
ft denotes a focal length of the zoom lens in the telephoto end state.

A zoom lens according to a second invention has the same configuration as the zoom lens according to the first invention and satisfies following conditional expressions (1A) and (3A).

$$1.80 < f1/(fw \times ft)^{1/2} < 2.40 \quad (1A)$$

$$0.50 < -f5/f4 < 1.00 \quad (3A)$$

where, f5 denotes a focal length of the fifth lens group.

A zoom lens according to a third invention has the same configuration as the zoom lens according to the first invention and satisfies following conditional expressions (2A) and (5A).

$$0.86 < -f4/(fw \times ft)^{1/2} < 1.18 \quad (2A)$$

$$0.10 < Dm4/(fw \times ft)^{1/2} < 0.30 \quad (5A)$$

where, Dm4 denotes a difference in position of the fourth lens group between the wide angle end state and the telephoto end state on an optical axis (displacement toward the object is positive).

An optical apparatus according to the present invention comprises the abovementioned zoom lens.

In a method for manufacturing the zoom lens according to the present invention, the zoom lens comprises, in order from an object: a first lens group having a positive refractive power; a second lens group having a negative refractive power; a third lens group having a positive refractive power; a fourth lens group having a negative refractive power; and a fifth lens group having a positive refractive power, and the method comprises disposing the first lens group to the fifth lens group in a lens barrel such that intervals between adjacent lens groups change and the first lens group, the second lens group, the third lens group, and the fourth lens group move upon zooming from a wide angle end state to a telephoto end state, and such that following conditional expressions (1) and (2), conditional expressions (1A) and (3A), conditional expressions (2A) and (5A), or the like is satisfied.

$$1.80 < f1/(fw \times ft)^{1/2} < 2.60 \quad (1)$$

$$0.75 < -f4/(fw \times ft)^{1/2} < 1.20 \quad (2)$$

where, f1 denotes a focal length of the first lens group,
f4 denotes a focal length of the fourth lens group,
fw denotes a focal length of the zoom lens in the wide angle end state, and
ft denotes a focal length of the zoom lens in the telephoto end state.

$$1.80 < f1/(fw \times ft)^{1/2} < 2.40 \quad (1A)$$

$$0.50 < -f5/f4 < 1.00 \quad (3A)$$

where, f5 denotes a focal length of the fifth lens group.

$$0.86 < -f4/(fw \times ft)^{1/2} < 1.18 \quad (2A)$$

$$0.10 < Dm4/(fw \times ft)^{1/2} < 0.30 \quad (5A)$$

where, Dm4 denotes a difference in position of the fourth lens group between the wide angle end state and the telephoto end state on an optical axis (displacement toward the object is positive).

BRIEF DESCRIPTION OF THE DRAWINGS

FIG. 1 is a cross-sectional view illustrating a lens configuration of a zoom lens according to Example 1 of this embodiment;

FIG. 2A, FIG. 2B, and FIG. 2C are various aberration graphs of the zoom lens according to Example 1 in a wide angle end state, an intermediate focal length state, and a telephoto end state;

FIG. 3 is a cross-sectional view illustrating a lens configuration of a zoom lens according to Example 2 of this embodiment;

FIG. 4A, FIG. 4B, and FIG. 4C are various aberration graphs of the zoom lens according to Example 2 in a wide angle end state, an intermediate focal length state, and a telephoto end state;

FIG. 5 is a cross-sectional view illustrating a lens configuration of a zoom lens according to Example 3 of this embodiment;

FIG. 6A, FIG. 6B, and FIG. 6C are various aberration graphs of the zoom lens according to Example 3 in a wide angle end state, an intermediate focal length state, and a telephoto end state;

FIG. 9 is a cross-sectional view illustrating a lens configuration of a zoom lens according to Example 5 of this embodiment;

FIG. 10A, FIG. 10B, and FIG. 10C are various aberration graphs of the zoom lens according to Example 5 in a wide angle end state, an intermediate focal length state, and a telephoto end state;

FIG. 12 is a flowchart illustrating an overview of a method for manufacturing the zoom lens according to this embodiment.

DESCRIPTION OF THE EMBODIMENTS

Figure 2B:
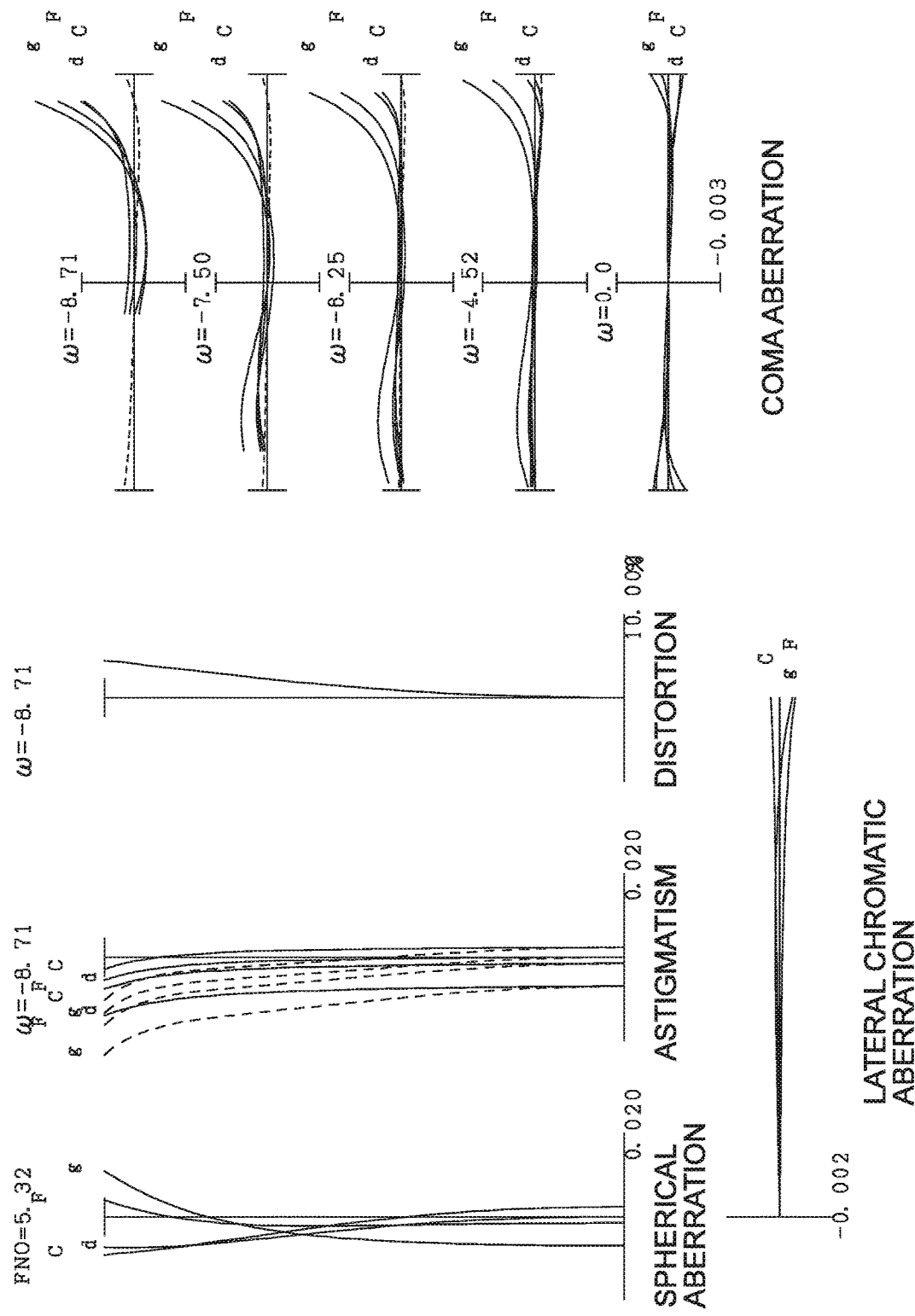

Embodiments are described below with reference to the drawings. As illustrated in FIG. 1, a zoom lens ZL(1) that is an example of a zoom lens ZL according to Embodiment 1 comprises, in order from an object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power, in which intervals between adjacent lens groups change and the first lens group G1, the second lens group G2, the third lens group G3, and the fourth lens group G4 move upon zooming from a wide angle end state to a telephoto end state. In the configuration as above, the zoom lens ZL according to this embodiment satisfies following conditional expressions (1) and (2).

$$1.80 < f1/(fw \times ft)^{1/2} < 2.60 \tag{1}$$

$$0.75 < -f4/(fw \times ft)^{1/2} < 1.20 \tag{2}$$

where, f1 denotes a focal length of the first lens group G1, f4 denotes a focal length of the fourth lens group G4, fw denotes a focal length of the zoom lens ZL in the wide angle end state, and ft denotes a focal length of the zoom lens ZL in the telephoto end state.

As illustrated in FIG. 1, a zoom lens according to Embodiment 2 comprises, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power, in which intervals between adjacent lens groups change and the first lens group G1, the second lens group G2, the third lens group G3, and the fourth lens group G4 move upon zooming from a wide angle end state to a telephoto end state. In the configuration as above, the zoom lens ZL according to Embodiment 2 satisfies following conditional expressions (1A) and (3A).

$$1.80 < f1/(fw \times ft)^{1/2} < 2.40 \tag{1A}$$

$$0.50 < -f5/f4 < 1.00 \tag{3A}$$

where, f1 denotes a focal length of the first lens group, f4 denotes a focal length of the fourth lens group, f5 denotes a focal length of the fifth lens group, fw denotes a focal length of the zoom lens in the wide angle end state, and ft denotes a focal length of the zoom lens in the telephoto end state.

As illustrated in FIG. 1, a zoom lens according to Embodiment 3 comprises, in order from the object: a first lens group G1 having a positive refractive power, a second lens group G2 having a negative refractive power, a third lens group G3 having a positive refractive power, a fourth lens group G4 having a negative refractive power, and a fifth lens group G5 having a positive refractive power, in which intervals between adjacent lens groups change and the first lens group G1, the second lens group G2, the third lens group G3, and the fourth lens group G4 move upon zooming from a wide angle end state to a telephoto end state. In the configuration as above, the zoom lens ZL according to Embodiment 3 satisfies following conditional expressions (2A) and (5A).

$$0.86 < -f4/(fw \times ft)^{1/2} < 1.18 \tag{2A}$$

$$0.10 < Dm4/(fw \times ft)^{1/2} < 0.30 \tag{5A}$$

where, f4 denotes a focal length of the fourth lens group,

Dm4 denotes a difference in position of the fourth lens group between the wide angle end state and the telephoto end state on an optical axis (displacement toward the object is positive), fw denotes a focal length of the zoom lens in the wide angle end state, and ft denotes a focal length of the zoom lens in the telephoto end state.

It is preferred that a following conditional expression (3) be satisfied in the zoom lens according to Embodiment 1 and Embodiment 3.

$$0.50 < -f5/f4 < 1.30 \tag{3}$$

where, f5 denotes a focal length of the fifth lens group.

It is preferred that a following conditional expression (5) be satisfied in the zoom lens according to Embodiment 1 to Embodiment 3.

$$0.05 < Dm4/(fw \times ft)^{1/2} < 0.40 \tag{5}$$

where, Dm4 denotes a difference in position of the fourth lens group between the wide angle end state and the telephoto end state on the optical axis (displacement toward the object is positive).

Figure 7:
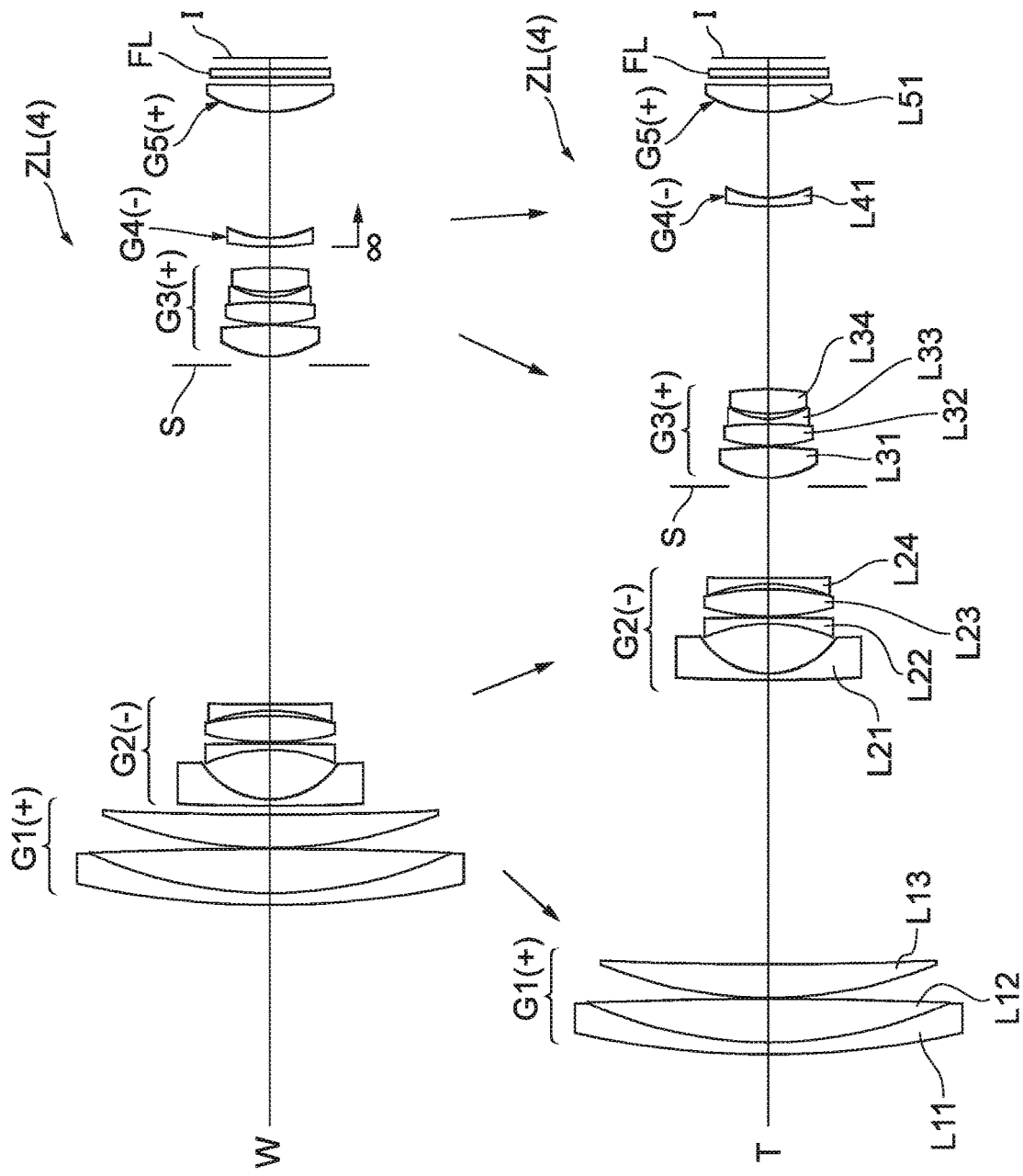
FIG. 7 is a cross-sectional view illustrating a lens configuration of a zoom lens according to Example 4 of this embodiment.

The zoom lens ZL according to an embodiment above may be a zoom lens ZL(2) illustrated in FIG. 3, a zoom lens ZL(3) illustrated in FIG. 5, a zoom lens ZL(4) illustrated in FIG. 7, or a zoom lens ZL(5) illustrated in FIG. 9.

According to the configuration above, a zoom lens that performs high zooming and has a high optical performance can be realized. The conditional expressions (1) and (1A) define the focal length of the first lens group G1. Various aberrations such as a spherical aberration, a curvature of field, a lateral chromatic aberration, and a coma aberration can be suppressed by satisfying the conditional expression (1) or (1A).

In the zoom lens according to this embodiment, when an upper limit value of the conditional expression (1) or (1A) is exceeded, the refractive power of the first lens group G1 decreases and the lens movement amount upon zooming increases, thereby increasing a total length. Further, in this case, the refractive power of other lens groups is increased, and correction of various aberrations such as a lateral chromatic aberration and a coma aberration in the telephoto end state becomes difficult. It is more preferred that the upper limit value of the conditional expression (1) or (1A) be set to 2.45, further set to 2.40, further set to 2.35, further set to 2.30, and further set to 2.25 in order to ensure the effect of this embodiment.

Meanwhile, when a lower limit value of the conditional expression (1) or (1A) is not reached, the refractive power of the first lens group G1 increases and correction of various aberrations such as a spherical aberration and a curvature of field in the telephoto end state becomes difficult. It is more preferred that the lower limit value of the conditional expression (1) or (1A) be set to 1.90, further set to 1.95, further set to 2.00, and further set to 2.05 in order to ensure the effect of this embodiment.

Next, the conditional expressions (2) and (2A) define the focal length of the fourth lens group G4. When an upper limit value of the conditional expression (2) or (2A) is exceeded, the refractive power of the fourth lens group G4 becomes weaker and the movement amount by the zooming increases. In addition, fluctuations such as a curvature of field due to zooming also increase. In order to reduce the movement amount of the fourth lens group G4, the refractive power of the third lens group G3 needs to be stronger and the correction of the coma aberration becomes difficult. It is more preferred that the upper limit value of the conditional expression (2) or (2A) be set to 1.18, further set to 1.14, further set to 1.10, further set to 1.06, and further set to 1.00 in order to ensure the effect of this embodiment.

Meanwhile, when a lower limit value of the conditional expression (2) or (2A) is not reached, the refractive power of the fourth lens group G4 becomes stronger and correction of various aberrations such as a curvature of field becomes difficult. It is more preferred that the lower limit value of the conditional expression (2) or (2A) be set to 0.78, further set to 0.82, and further set to 0.86 in order to ensure the effect of this embodiment.

The conditional expressions (3) and (3A) define a ratio of the focal length of the fifth lens group G5 to the focal length of the fourth lens group G4. When an upper limit of the conditional expression (3) or (3A) is exceeded, the refractive power of the fifth lens group G5 decreases, correction of various aberrations such as a curvature of field becomes difficult, the refractive power of the fourth lens group G4 increases, and correction of a spherical aberration and an axial chromatic aberration becomes difficult. It is more preferred that an upper limit value of the conditional expression (3) or (3A) be set to 1.20, further set to 1.10, further set to 1.00, and further set to 0.95 in order to ensure the effect of this embodiment.

Meanwhile, when a lower limit of the conditional expression (3) or (3A) is not reached, the refractive power of the fifth lens group G5 increases, correction of various aberrations such as a curvature of field becomes difficult, the refractive power of the fourth lens group G4 decreases, and the movement amount of the fourth lens group increases. Note that correction of various aberrations such as a curvature of field and a lateral chromatic aberration becomes difficult when the refractive power of other lens groups is increased in order to maintain the optical total length. It is more preferred that a lower limit value of the conditional expression (3) or (3A) be set to 0.60, further set to 0.65, further set to 0.70 in order to ensure the effect of this embodiment.

The conditional expressions (5) and (5A) define the movement amount of the fourth lens group G4. When an upper limit value of the conditional expression (5) or (5A) is exceeded, there is a need to increase the refractive power of other lens groups in order to maintain the optical total length. However, when the refractive power of other lens groups is increased, correction of various aberrations such as a curvature of field and a lateral chromatic aberration becomes difficult. It is more preferred that the upper limit value of the conditional expression (5) or (5A) be set to 0.35, further set to 0.30, further set to 0.25, further set to 0.22 in order to ensure the effect of this embodiment.

Meanwhile, when a lower limit value of the conditional expression (5) or (5A) is not reached, correction of various aberrations such as a spherical aberration and an axial chromatic aberration becomes difficult. It is more preferred that the lower limit value of the conditional expression (5) or (5A) be set to 0.10, further set to 0.14, and further set to 0.18 in order to ensure the effect of this embodiment.

In the zoom lens ZL according to this embodiment, it is preferred that the fifth lens group G5 be stationary. As a result, fluctuations such as a spherical aberration and a distortion upon zooming can be suppressed.

In the zoom lens ZL according to this embodiment, intervals between adjacent lens groups change upon zooming from the wide angle end state to the telephoto end state, but it is preferred that an interval between the first lens group G1 and the second lens group G2 increases and an interval between the second lens group G2 and the third lens group G3 decreases upon zooming from the wide angle end state to the telephoto end state. According to the configuration above, a higher zooming and a satisfactory optical performance can be attained.

In the zoom lens ZL according to this embodiment, it is preferred that a following conditional expression (4) be satisfied.

$$1.20 < -f2/fw < 1.60 \quad (4)$$

where, f2 denotes a focal length of the second lens group G2.

The conditional expression (4) defines a focal length of the second lens group G2. When an upper limit value of the conditional expression (4) is exceeded, the power of the second lens group G2 becomes weaker, thereby causing the movement amount upon zooming to increase and the total length to increase. When the power of the third lens group G3 is caused to be stronger in order to increase a zooming rate while keeping the movement amount of the second lens group G2 to be small, a spherical aberration in the telephoto end state is excessively corrected and correction of a coma aberration and a curvature of field becomes difficult. It is more preferred that the upper limit value of the conditional expression (4) be set to 1.55, further set to 1.50, and further set to 1.45 in order to ensure the effect of this embodiment.

Meanwhile, when a lower limit value of the conditional expression (4) is not reached, the power of the second lens group G2 becomes stronger and correction of a spherical aberration and the like becomes difficult. It is more preferred that the lower limit value of the conditional expression (4) be set to 1.25, further set to 1.30, and further set to 1.35 in order to ensure the effect of this embodiment.

In the zoom lens ZL according to this embodiment, it is preferred that a following conditional expression (6) be satisfied.

$$15.0 < \omega w < 65.0 \quad (6)$$

where, $\omega w$ denotes a half angle of view (unit: degree) of an entirety of the zoom lens in the wide angle end state.

The conditional expression (6) is a conditional expression that defines an optimal value of a half angle of view in the wide angle end state. A wider half angle of view can be obtained and various aberrations such as a coma aberration, a curvature of field, and a distortion can be satisfactorily corrected by satisfying the conditional expression (6).

It is more preferred that a lower limit value of the conditional expression (6) be set to 20.0, further set to 25.0, further set to 30.0, further set to 35.0, further set to 38.0, and further set to 40.0 in order to ensure the effect of this embodiment.

Meanwhile, it is more preferred that an upper limit value of the conditional expression (6) be set to 60.0, further set to 55.0, further set to 50.0, and further set to 47.0 in order to ensure the effect of this embodiment.

In the zoom lens ZL according to this embodiment, it is desired that a following conditional expression (7) be satisfied.

$$0.5 < \omega t < 7.0 \qquad (7)$$

where, $\omega t$ denotes a half angle of view (unit: degree) of an entirety of the zoom lens in the telephoto end state.

The conditional expression (7) is a conditional expression that defines an optimal value of a half angle of view in the telephoto end state. Various aberrations such as a coma aberration, a curvature of field, and a distortion can be satisfactorily corrected by satisfying the conditional expression (7).

It is more preferred that a lower limit value of the conditional expression (7) be set to 0.7, further set to 1.0, further set to 1.2, and further set to 1.3 in order to ensure the effect of this embodiment.

Meanwhile, it is more preferred that an upper limit value of the conditional expression (7) be set to 6.0, further set to 5.0, further set to 4.0, further set to 3.0, and further set to 2.5 in order to ensure the effect of this embodiment.

In the zoom lens ZL according to this embodiment, it is preferred that the third lens group G3 include at least one aspheric lens. As a result, the optical performance of the zoom lens ZL can be further enhanced.

In the zoom lens ZL according to this embodiment, it is preferred that at least a part of the fourth lens group G4 be a focus lens. As a result, fluctuations of various aberrations such as a spherical aberration and a coma aberration upon focusing can be reduced. Note that at least a part of the fourth lens group G4 configuring the focus lens is moved to an image side in an optical axis direction when focusing from infinity to a short distance object is performed.

In the zoom lens ZL according to this embodiment, it is preferred that at least a part of the third lens group G3 configure a vibration-proof lens group having a displacement component in a direction perpendicular to the optical axis. As a result, fluctuations of various aberrations such as a coma aberration during image shake correction can be reduced.

According to the zoom lens ZL according to this embodiment including the configuration as above, a zoom lens that performs high zooming and has a satisfactory optical performance can be realized.

Figure 11:
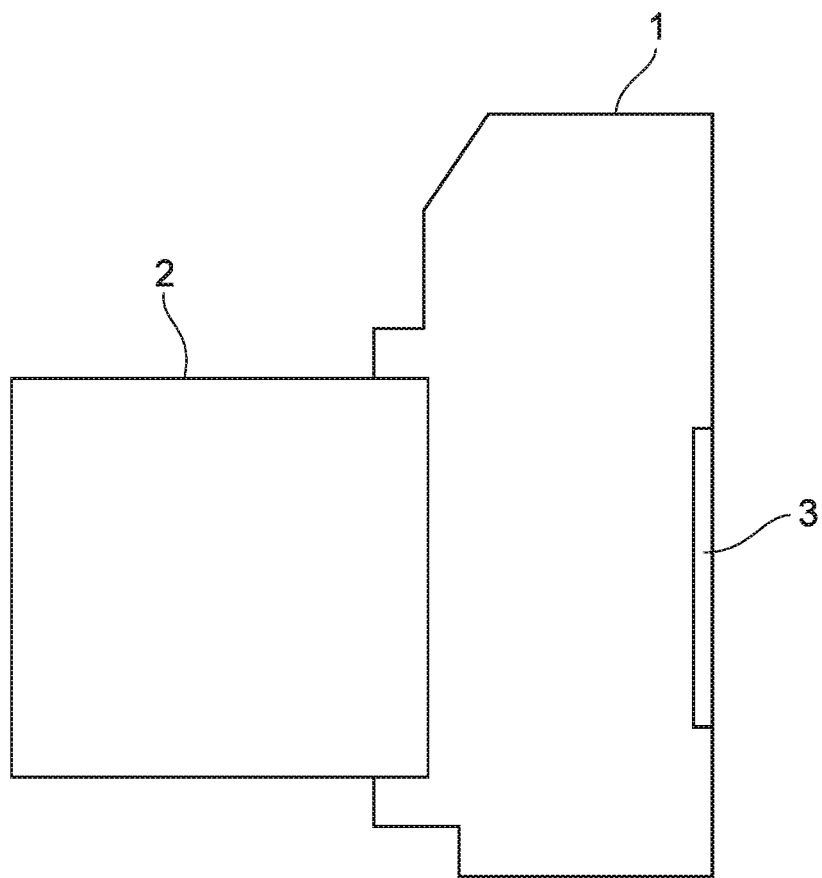
FIG. 11 is a schematic view illustrating a configuration of a camera including the zoom lens according to this embodiment.

An optical apparatus of this embodiment comprises the zoom lens ZL having the abovementioned configuration. As a specific example, a camera (optical apparatus) including the zoom lens ZL is described with reference to FIG. 11. A camera 1 is a digital camera including the zoom lens ZL according to the embodiment above as a photographing lens 2 as illustrated in FIG. 11. In the camera 1, light from an object (subject) (not shown) is collected by the photographing lens 2 and reaches an image sensor 3. As a result, the light from the subject is imaged by the image sensor 3 and recorded in a memory as a subject image (not shown). As described above, a photographer can photograph the subject by the camera 1. Note that the camera may be a mirrorless camera or a single-lens reflex camera including a quick return mirror. An auxiliary light emission unit that emits auxiliary light when the subject is dark, function buttons to be used for various condition setting and the like for a digital still camera, and the like (not shown) are provided to the camera 1.

A compact camera in which the camera 1 and the zoom lens ZL are integrally molded is exemplified here, but the optical apparatus may be a single lens reflex camera in which a lens barrel including the zoom lens ZL and a camera body are mountable and removable.

According to the camera 1 according to this embodiment having the configuration as above, a camera that performs high zooming and has a satisfactory optical performance can be realized by mounting the abovementioned zoom lens ZL as the photographing lens.

Next, a method for manufacturing the abovementioned zoom lens ZL is described with reference to FIG. 12. First, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power are disposed in line in the lens barrel in order from the object (step ST1). Next, the first lens group G1 to the fifth lens group G5 are configured such that intervals between adjacent lens groups change and the first lens group G1, the second lens group G2, the third lens group G3, and the fourth lens group G4 move upon zooming from the wide angle end state to the telephoto end state (step ST2). Further, the first lens group G1 to the fifth lens group G5 are configured such that the conditional expressions (1) and (2), the conditional expressions (1A) and (3A), the conditional expressions (2A) and (5A), or the like are satisfied (step ST3).

According to the manufacturing method according to this embodiment as above, the zoom lens ZL that performs high zooming and has a satisfactory optical performance can be manufactured.

EXAMPLES

The zoom lens ZL according to examples of this embodiment is described below on the basis of the drawings. FIG. 1, FIG. 3, FIG. 5, FIG. 7, and FIG. 9 are cross-sectional views illustrating configurations and the like of the zoom lens ZL {ZL(1) to ZL(5)} according to Example 1 to Example 5. In the cross-sectional views, positions of the lens groups upon zooming from a wide angle end state (W) to a telephoto end state (T) are illustrated. Arrows illustrated in the middle section of the drawings above indicate movement directions of the first lens group G1 to the fourth lens group G4 upon zooming (zooming operation) from the wide angle end state to the telephoto end state. Note that the fifth lens group G5 is maintained to be stationary.

In the drawings above, each lens group is denoted by a combination of character G and numerals, and each lens is denoted by a combination of character L and numerals. In this case, in order to prevent complication due to the types and numbers of the characters and numerals increasing, the lens groups and the like are indicated with use of combinations of characters and numerals so as to be independent of each other for each example. Therefore, even if the same combinations of characters and numerals are used among the examples, it does not mean that the configurations are the same.

Table 1 to Table 5 are described below. The tables are tables that indicate specification data in Example 1 to Example 5.

In a [Lens specifications] table, the order of optical surfaces from the object side along a direction in which a light beam progresses is denoted by a surface number, a radius of curvature (a surface of which a center of curvature is located on the image side is set to be a positive value) of each optical surface is denoted by R, a distance to the next lens surface that is a distance from each optical surface to the next optical surface on the optical axis is denoted by D, a refractive index of a material of an optical member with respect to a d-line (wavelength: 587.6 nm) is denoted by nd, and an Abbe number of the material of the optical member with respect to the d-line is denoted by υd. The surface number indicates the order of lens surfaces from the object along the direction in which the light beam progresses. Character "∞" of the radius of curvature indicates a flat surface or an aperture, and (Stop S) indicates an aperture stop S. The description of a refractive index nd=1.00000 of air is omitted. When the lens surface is an aspherical surface, a symbol * is applied to the surface number and a paraxial radius of curvature is indicated in the column of the radius of curvature R.

In an [Aspherical surface data] table, shapes of the aspherical surfaces indicated in the [Lens specifications] are indicated by an expression (a) below. A distance (sag amount) from a tangent plane of a vertex of an aspherical surface to a position on an aspherical surface at a height y along the optical axis direction is denoted by X(y), a radius of curvature (paraxial radius of curvature) of a reference spherical surface is denoted by R, a conical coefficient is denoted by κ, and the i-th aspherical coefficient is denoted by Ai. The character "E-n" denotes "×10$^{-n}$". For example, 1.234E−05=1.234×10$^{-5}$ is satisfied. Note that a secondary aspherical coefficient A2 is 0 and description thereof is omitted.

$$X(y)=(y^2/R)/\{1+(1-\kappa \times y^2/R^2)^{1/2}\}+A4 \times y^4+A6 \times y^6+A8 \times y^8+A10 \times y^{10} \quad (a)$$

An [Entire specifications] table indicates the specifications of the entire zoom lens. A focal length of the entire zoom lens is denoted by f, an F-number is denoted by FNo, and a half angle of view (maximum incident angle, unit is "° (degree)") is denoted by ω. A distance (back focus) from a lens last surface to an image surface I on the optical axis upon focusing on infinity is denoted by Bf and a lens total length that is a distance obtained by adding Bf to a distance from a lens forefront surface to the lens last surface on the optical axis is denoted by TL. Note that the values are indicated for the zooming states of the wide angle end state (Wide), the intermediate focal length state (Middle), and the telephoto end state (Tele).

A [Variable interval data] table indicates a distance Di to the next lens surface of a surface number i of which surface distance is "variable" in the table indicating [Lens specifications]. For example, in Example 1, surface distances D5, D13, D21, and D23 are indicated for the surface numbers 5, 13, 21, and 23.

In a [Lens group data] table, surface numbers of group starting surfaces (surfaces closest to the object) in the first lens group to the fifth lens group, focal lengths of the groups, and lens configuration lengths are indicated.

In a [Conditional expression corresponding value] table, values corresponding to the abovementioned conditional expressions (1) to (7) are indicated.

In all the specification values below, "mm" is generally used for the indicated focal length f, the radius of curvature R, the surface distance D, other lengths, and the like unless otherwise specified, but equivalent optical performances can be obtained even if an optical system is proportionally expanded or proportionally reduced, and hence the present invention is not limited thereto.

Matters common to all the examples have been described above and overlapping descriptions for each example are omitted below.

Example 1

Example 1 is described with reference to FIG. 1, FIGS. 2A-2C, and Table 1. FIG. 1 is a view illustrating a lens configuration of the zoom lens ZL(1) according to Example 1 of this embodiment. The zoom lens ZL(1) comprises, in order from the object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. Refractive powers of the lens groups are denoted by a character (+) or (−) applied to the lens group symbols.

The aperture stop S that determines the brightness is disposed on the object side of the third lens group G3. The aperture stop S is disposed so as to be independent of the third lens group G3, but is moved with the third lens group G3 in the optical axis direction. A filter group FL is disposed near the image surface I and at a place on the image side than the fifth lens group G5. The filter group FL is configured by a glass block such as a low pass filter and an infrared cut filter for cutting off a spatial frequency equal to or more than a resolution limit of a solid state image sensor such as a CCD provided on the image surface I.

The first lens group G1 to the fourth lens group G4 are configured to move in the axial direction upon zooming as indicated by the arrows in FIG. 1. Therefore, the surface distances D5, D13, D21, and D23 are variable and values thereof are indicated in the [Variable interval data] table.

The first lens group G1 consists of, in order from the object, a cemented lens obtained by cementing a negative meniscus lens L11 having a concave surface facing the image side and a biconvex positive lens L12 and a positive meniscus lens L13 having a convex surface facing the object side.

The second lens group G2 consists of, in order from the object, a negative meniscus lens L21 having a concave surface facing the image side, a biconcave negative lens L22, a biconvex positive lens L23, and a biconcave negative lens L24.

The third lens group G3 consists of, in order from the object, a biconvex positive lens L31, a cemented lens obtained by cementing a biconvex positive lens L32 and a biconcave negative lens L33, and a biconvex positive lens L34. The biconvex positive lens L31 has a surface on the object side and a surface on the image side that are both aspherical surfaces.

The fourth lens group G4 consists of a negative meniscus lens L41 having a concave surface facing the image side.

The fifth lens group G5 consists of a biconvex positive lens L51. The biconvex positive lens L51 has a surface on the object side that is an aspherical surface.

In the zoom lens ZL(1), focusing from infinity (long distance object) to the short distance object is performed by moving the fourth lens group G4 in an image surface direction.

In the zoom lens ZL(1), all or at least a part of the third lens group G3 (the third lens group G3 may be the entire third lens group G3 or may be one of or a combination of lenses L31 to L34 configuring the third lens group G3) configures the vibration-proof lens group having a displacement component in a direction perpendicular to the optical axis and is configured to perform the image blur correction (vibration proof and image shake correction) on the image surface I.

The zoom lens ZL(1) according to this example moves four lens groups G1 to G4 such that an interval between the first lens group G1 and the second lens group G2 increases, an interval between the second lens group G2 and the third lens group G3 decreases, an interval between the third lens group G3 and the fourth lens group G4 changes, and an interval between the fourth lens group G4 and the fifth lens group G5 changes upon zooming from the wide angle end state to the telephoto end state. Specifically, the first lens group G1 is moved to the object side, the second lens group G2 is moved to the image side, the third lens group G3 is moved to the object side, and the fourth lens group G4 is temporarily moved to the image side and then moved to the object side upon zooming as indicated by the arrows in FIG. 1. The aperture stop S is integrally moved with the third lens group G3 upon zooming. Note that the fifth lens group G5 is maintained to be stationary.

Values of the specifications of an optical system according to Example 1 are indicated in Table 1 below.

TABLE 1

[Lens specifications]

| Surface number | R | D | nd | vd |
|---|---|---|---|---|
| 1 | 19.71912 | 0.21445 | 1.801000 | 34.92 |
| 2 | 7.61617 | 0.83521 | 1.497000 | 81.73 |
| 3 | −51.61073 | 0.02258 | | |
| 4 | 8.12988 | 0.58691 | 1.603000 | 65.44 |
| 5 | 136.27818 | D5(Variable) | | |
| 6 | 29.81441 | 0.11287 | 1.788000 | 47.35 |
| 7 | 1.46108 | 0.79007 | | |
| 8 | −3.21279 | 0.12415 | 1.903658 | 31.31 |
| 9 | 14.58795 | 0.02257 | | |
| 10 | 3.53665 | 0.58691 | 1.922860 | 20.88 |
| 11 | −3.53643 | 0.07111 | | |
| 12 | −2.52745 | 0.12415 | 1.804400 | 39.61 |
| 13 | 129.75512 | D13(Variable) | | |
| 14 | ∞ | 0.15801 | (Stop S) | |
| *15 | 1.65103 | 0.49661 | 1.497103 | 81.56 |
| *16 | −5.88131 | 0.02257 | | |
| 17 | 1.75951 | 0.49661 | 1.531720 | 48.78 |
| 18 | −1316.98524 | 0.09029 | 1.910822 | 35.25 |
| 19 | 1.36799 | 0.14673 | | |
| 20 | 3.69061 | 0.38375 | 1.497000 | 81.73 |
| 21 | −3.69039 | D21(Variable) | | |
| 22 | 3.21095 | 0.13544 | 1.497000 | 81.73 |
| 23 | 1.46240 | D23(Variable) | | |
| *24 | 3.02088 | 0.49661 | 1.531100 | 55.90 |
| 25 | −10.85897 | 0.13544 | | |
| 26 | ∞ | 0.16027 | 1.516800 | 63.88 |
| 27 | ∞ | | | |

[Aspherical surface data]

| | κ | A4 | A6 | A8 | A10 |
|---|---|---|---|---|---|
| Fifteenth surface | −0.62150 | 2.81952E−04 | 0.00000E+00 | 0.00000E+00 | 0.00000E+00 |
| Sixteenth surface | 0.00000 | 1.71338E−02 | −3.18963E−03 | 0.00000E+00 | 0.00000E+00 |
| Twenty-fourth surface | 4.09980 | 8.89882E−04 | 0.00000E+00 | 0.00000E+00 | 0.00000E+00 |

| | Wide | Middle | Tele |
|---|---|---|---|

[Entire specifications]
Zoom ratio 32.84422

| | Wide | Middle | Tele |
|---|---|---|---|
| f | 1.00000 | 5.71106 | 32.84422 |
| FNo | 3.51252 | 5.31961 | 7.20866 |
| ω | 43.64080 | 8.71165 | 1.57082 |

TABLE 1-continued

| TL | 15.27866 | 18.44632 | 22.54470 |
|---|---|---|---|
| Bf | 0.19187 | 0.19188 | 0.19189 |

[Variable interval data]

| D5 | 0.15801 | 5.32566 | 9.14383 |
|---|---|---|---|
| D13 | 5.98317 | 1.77271 | 0.38375 |
| D21 | 0.63102 | 3.60864 | 3.37272 |
| D23 | 2.10126 | 1.33410 | 3.23919 |

[Lens group data]

| Group number | Group starting surface | Group focal length | Lens configuration length |
|---|---|---|---|
| G1 | 1 | 12.50461 | 1.65915 |
| G2 | 6 | −1.38854 | 1.83183 |
| G3 | 15 | 2.70627 | 1.79458 |
| G4 | 22 | −5.54602 | 0.13544 |
| G5 | 24 | 4.50593 | 0.79232 |

[Conditional expression corresponding value]

Conditional expressions (1) and (1A) $f1/(fw \times ft)^{1/2} = 2.182$
Conditional expressions (2) and (2A) $-f4/(fw \times ft)^{1/2} = 0.968$
Conditional expressions (3) and (3A) $-f5/f4 = 0.812$
Conditional expression (4) $-f2/fw = 1.389$
Conditional expressions (5) and (5A) $Dm4/(fw \times ft)^{1/2} = 0.199$
Conditional expression (6) $\omega w = 43.64080$
Conditional expression (7) $\omega t = 1.57082$ As indicated in the [Conditional expression corresponding value] table, the zoom lens ZL(1) according to Example 1 illustrated in FIG. 1 satisfies all the conditional expressions (1) to (7).

Figure 2C:
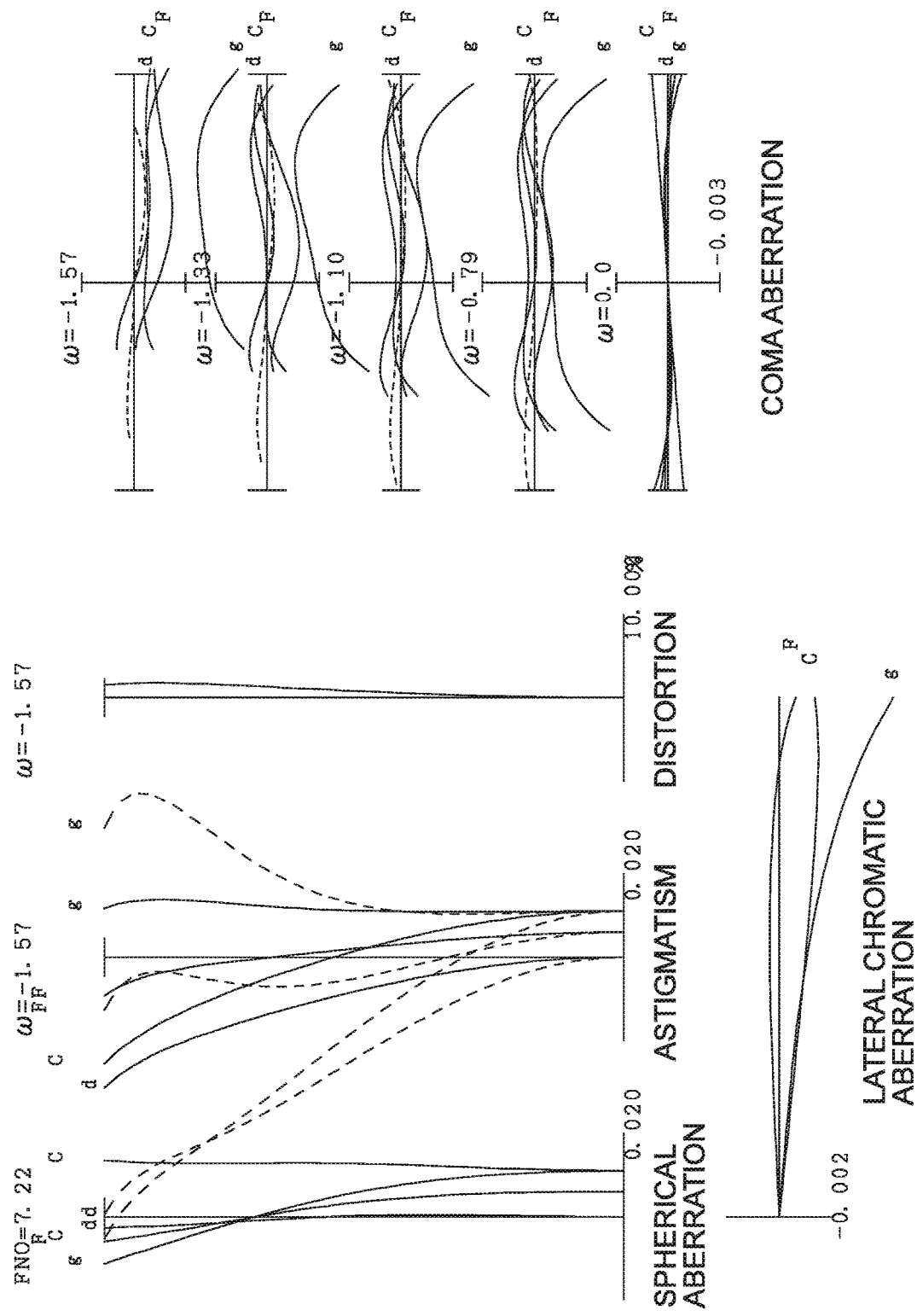

FIG. 2A, FIG. 2B, and FIG. 2C are various aberration graphs (spherical aberration graphs, astigmatism graphs, distortion graphs, coma aberration graphs, and lateral chromatic aberration graphs) of the zoom lens ZL(1) according to Example 1 in the wide angle end state, the intermediate focal length state, and the telephoto end state upon focusing on infinity. As can be seen from the various aberration graphs, the zoom lens ZL(1) according to Example 1 satisfactorily corrects various aberrations from the wide angle end state to the telephoto end state and has an excellent imaging performance. Note that the distortion can be corrected by image processing after the imaging, and optical correction is unnecessary.

In FIG. 2, an F-number is denoted by FNO and a half angle of view (unit is "°") with respect to each image height is denoted by ω. A d-line (wavelength: 587.6 nm) is denoted by d, a g-line (wavelength: 435.8 nm) is denoted by g, a C-line (wavelength: 656.3 nm) is denoted by C, and an F-line (wavelength: 486.1 nm) is denoted by F. In the spherical aberration graph, the astigmatism graph, and the coma aberration graph, the solid line indicates aberration on a sagittal image surface and a broken line indicates aberration on a meridional image surface. The description applies to all the aberration graphs in the examples below, and overlapping descriptions are omitted below.

Example 2

Example 2 is described with reference to FIG. 3, FIGS. 4A-4C, and Table 2. FIG. 3 is a view illustrating a lens configuration of the zoom lens ZL(2) according to Example 2 of this embodiment. The zoom lens ZL(2) comprises, in order from the object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The aperture stop S is disposed on the object side of the third lens group G3 and is moved with the third lens group G3 in the optical axis direction. The filter group FL is disposed between the fifth lens group G5 and the image surface I.

The first lens group G1 to the fourth lens group G4 are configured to move in the axial direction upon zooming as indicated by the arrows in FIG. 3. Therefore, the surface distances D5, D13, D21 and D24 are variable and values thereof are indicated in the [Variable interval data] table.

The first lens group G1 consists of, in order from the object, the cemented lens obtained by cementing the negative meniscus lens L11 having a concave surface facing the image side and the biconvex positive lens L12 and the positive meniscus lens L13 having a convex surface facing the object side.

The second lens group G2 consists of, in order from the object, a negative meniscus lens L21 having a concave surface facing the image side, a biconcave negative lens L22, a biconvex positive lens L23, and a negative meniscus lens L24 having a concave surface facing the object side. The negative meniscus lens L24 has a surface on the object side and a surface on the image side that are both aspherical surfaces.

The third lens group G3 consists of, in order from the object, a biconvex positive lens L31, a cemented lens obtained by cementing a biconvex positive lens L32 and a biconcave negative lens L33, and a biconvex positive lens L34. The biconvex positive lens L31 has a surface on the object side and a surface on the image side that are both aspherical surfaces.

The fourth lens group G4 consists of a cemented lens obtained by cementing a biconvex positive lens L41 and a biconcave negative lens L42.

The fifth lens group G5 consists of a positive meniscus lens L51 having a convex surface facing the object side. The positive meniscus lens L51 has a surface on the object side that is an aspherical surface.

In the zoom lens ZL(2), focusing from infinity (long distance object) to the short distance object is performed by moving the fourth lens group G4 in the image surface direction. In addition, all or at least a part of the third lens group G3 configures the vibration-proof lens group having a displacement component in a direction perpendicular to the optical axis and is configured to perform image blur correction (vibration proof and image shake correction) on the image surface I.

The zoom lens ZL(2) according to this example moves the first lens group G1 to the fourth lens group G4 such that an interval between the first lens group G1 and the second lens group G2 increases, an interval between the second lens group G2 and the third lens group G3 decreases, an interval between the third lens group G3 and the fourth lens group G4 changes, and an interval between the fourth lens group G4 and the fifth lens group G5 changes upon zooming from the wide angle end state to the telephoto end state. Specifically, the first lens group G1 is moved to the object side, the second lens group G2 is moved to the image side, the third lens group G3 is moved to the object side, and the fourth lens group G4 is moved to the image side upon zooming. Note that the fifth lens group G5 is maintained to be stationary.

Values of specifications of an optical system according to Example 2 are indicated in Table 2 below.

TABLE 2

| [Lens specifications] | | | | |
|---|---|---|---|---|
| Surface number | R | D | nd | νd |
| 1 | 17.30731 | 0.21445 | 1.850260 | 32.35 |
| 2 | 8.20516 | 0.81264 | 1.497000 | 81.73 |
| 3 | −54.40637 | 0.02257 | | |
| 4 | 8.16855 | 0.59819 | 1.603000 | 65.44 |
| 5 | 59.30568 | D5(Variable) | | |
| 6 | 16.23347 | 0.11287 | 1.834810 | 42.73 |
| 7 | 1.53193 | 0.80587 | | |
| 8 | −2.81111 | 0.11287 | 1.834810 | 42.73 |
| 9 | 20.54140 | 0.02257 | | |
| 10 | 4.42377 | 0.48533 | 1.922860 | 20.88 |
| 11 | −4.48371 | 0.11287 | | |
| *12 | −2.90243 | 0.11287 | 1.743300 | 49.32 |
| *13 | −60.00784 | D13(Variable) | | |
| 14 | ∞ | 0.15801 | (Stop S) | |
| *15 | 1.50262 | 0.56433 | 1.618810 | 63.86 |
| *16 | −6.71840 | 0.02257 | | |
| 17 | 3.52986 | 0.38375 | 1.497000 | 81.73 |
| 18 | −6.42953 | 0.09029 | 1.881000 | 40.15 |
| 19 | 1.33738 | 0.09932 | | |
| 20 | 1.94854 | 0.42889 | 1.497000 | 81.73 |
| 21 | −3.57352 | D21(Variable) | | |
| 22 | 3.09640 | 0.32731 | 1.755200 | 27.57 |
| 23 | −27.06478 | 0.09029 | 1.834000 | 37.18 |
| 24 | 1.75812 | D24(Variable) | | |
| *25 | 2.44724 | 0.47404 | 1.531100 | 55.91 |
| 26 | 45.14673 | 0.13544 | | |
| 27 | ∞ | 0.17610 | 1.516800 | 63.88 |
| 28 | ∞ | | | |

| [Aspherical surface data] | | | | | |
|---|---|---|---|---|---|
| | κ | A4 | A6 | A8 | A10 |
| Twelfth surface | 0.00000 | −1.21411E−02 | −3.11751E−03 | 0.00000E+00 | 0.00000E+00 |
| Thirteenth surface | 0.00000 | −1.22432E−02 | −7.31472E−04 | 0.00000E+00 | 0.00000E+00 |
| Fifteenth surface | −0.29020 | −9.58411E−03 | 0.00000E+00 | 0.00000E+00 | 0.00000E+00 |
| Sixteenth surface | 0.00000 | 2.01896E−02 | −1.97926E−03 | 0.00000E+00 | 0.00000E+00 |
| Twenty-fifth surface | 2.28820 | −6.53820E−03 | 0.00000E+00 | 0.00000E+00 | 0.00000E+00 |

| | Wide | Middle | Tele |
|---|---|---|---|
| [Entire specifications] Zoom ratio 32.91198 | | | |
| f | 1.00000 | 5.71106 | 32.91198 |
| FNo | 3.49744 | 5.36903 | 7.20657 |
| ω | 43.35795 | 8.75048 | 1.55310 |

TABLE 2-continued

| | | | |
|---|---|---|---|
| TL | 15.27652 | 18.24208 | 22.52451 |
| Bf | 0.18143 | 0.18143 | 0.18141 |

[Variable interval data]

| | | | |
|---|---|---|---|
| D5 | 0.15757 | 5.17089 | 9.19724 |
| D13 | 6.00017 | 1.70681 | 0.38458 |
| D21 | 0.33848 | 3.21853 | 3.12792 |
| D24 | 2.23541 | 1.60096 | 3.26990 |

[Lens group data]

| Group number | Group starting surface | Group focal length | Lens configuration length |
|---|---|---|---|
| G1 | 1 | 12.69752 | 1.64786 |
| G2 | 6 | −1.37396 | 1.76524 |
| G3 | 15 | 2.65677 | 1.74718 |
| G4 | 22 | −4.85327 | 0.41761 |
| G5 | 25 | 4.85327 | 0.78558 |

[Conditional expression corresponding value]

Conditional expressions (1) and (1A) $f1/(fw \times ft)^{1/2} = 2.213$
Conditional expressions (2) and (2A) $-f4/(fw \times ft)^{1/2} = 0.846$
Conditional expressions (3) and (3A) $-f5/f4 = 1.000$
Conditional expression (4) $-f2/fw = 1.374$
Conditional expressions (5) and (5A) $Dm4/(fw \times ft)^{1/2} = 0.180$
Conditional expression (6) $\omega w = 43.35795$
Conditional expression (7) $\omega t = 1.55310$ As indicated in the [Conditional expression corresponding value] table, the zoom lens ZL(2) according to Example 2 illustrated in FIG. 3 satisfies all the conditional expressions (1) to (7).

Figure 4A:
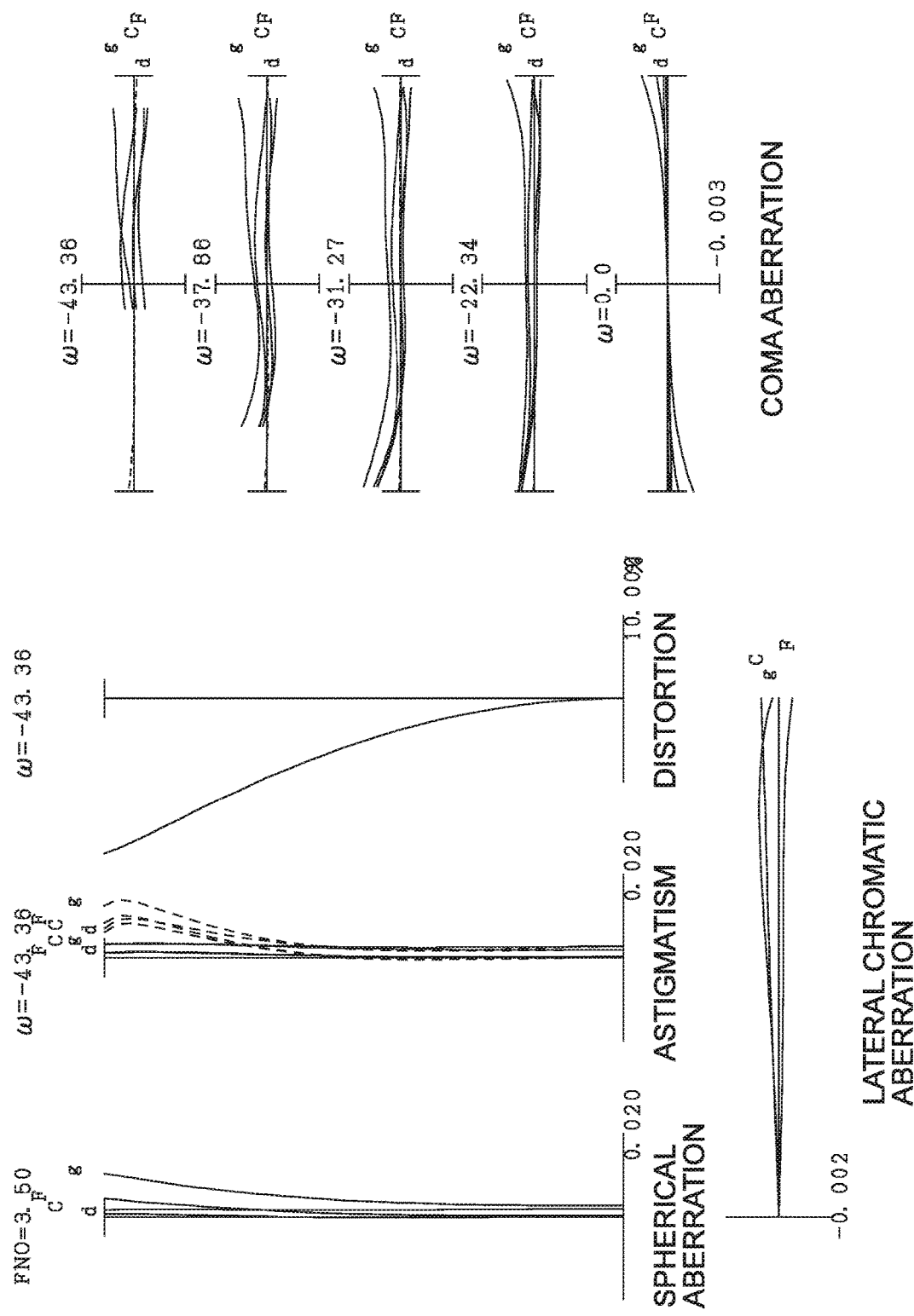
Figure 4B:
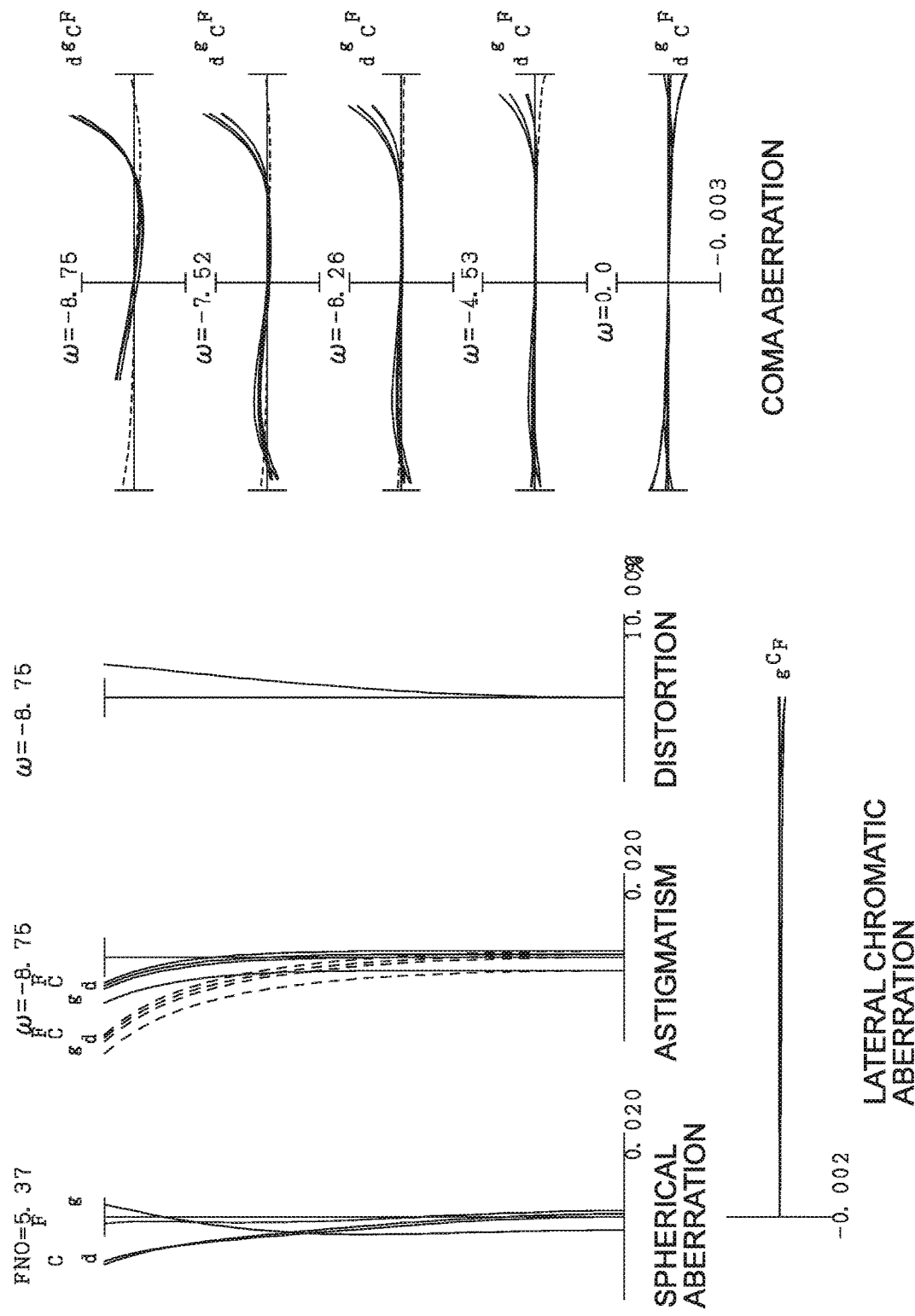

FIG. 4A, FIG. 4B, and FIG. 4C are various aberration graphs (spherical aberration graphs, astigmatism graphs, distortion graphs, coma aberration graphs, and lateral chromatic aberration graphs) of the zoom lens ZL(2) according to Example 2 in the wide angle end state, the intermediate focal length state, and the telephoto end state upon focusing on infinity. As can be seen from the various aberration graphs, the zoom lens ZL(2) according to Example 2 satisfactorily corrects various aberrations from the wide angle end state to the telephoto end state and has an excellent imaging performance.

Example 3

Example 3 is described with reference to FIG. 5, FIGS. 6A-6C, and Table 3. FIG. 5 is a view illustrating a lens configuration of the zoom lens ZL(3) according to Example 3 of this embodiment. The zoom lens ZL(3) comprises, in order from the object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The aperture stop S is disposed on the object side of the third lens group G3 and is configured to move with the third lens group G3 in the optical axis direction. The filter group FL is disposed between the fifth lens group G5 and the image surface I.

The first lens group G1 to the fourth lens group G4 are configured to move in the axial direction upon zooming as indicated by the arrows in FIG. 5. Therefore, the surface distances D5, D13, D21, and D23 are variable and values thereof are indicated in the [Variable interval data] table.

The first lens group G1 consists of, in order from the object, a cemented lens obtained by cementing a negative meniscus lens L11 having a concave surface facing the image side and a biconvex positive lens L12 and a positive meniscus lens L13 having a convex surface facing the object side.

The second lens group G2 consists of, in order from the object, a negative meniscus lens L21 having a concave surface facing the image side, a biconcave negative lens L22, a biconvex positive lens L23, and a biconcave negative lens L24. The negative meniscus lens L21 has a surface on the object side and a surface on the image side that are both aspherical surfaces.

The third lens group G3 consists of, in order from the object, a biconvex positive lens L31, a cemented lens obtained by cementing a biconvex positive lens L32 and a biconcave negative lens L33, and a biconvex positive lens L34. The biconvex positive lens L31 has a surface on the object side and a surface on the image side that are both aspherical surfaces.

The fourth lens group G4 consists of a negative meniscus lens L41 having a concave surface facing the image side. The negative meniscus lens L41 has a surface on the image side that is an aspherical surface.

The fifth lens group G5 consists of a biconvex positive lens L51. The biconvex positive lens L51 has a surface on the object side that is an aspherical surface.

In the zoom lens ZL(3), focusing from infinity (long distance object) to the short distance object is performed by moving the fourth lens group G4 in the image surface direction. In addition, all or at least a part of the third lens group G3 configures the vibration-proof lens group having a displacement component in a direction perpendicular to the optical axis and is configured to perform image blur correction (vibration proof and image shake correction) on the image surface I.

The zoom lens ZL(3) according to this example moves the first lens group G1 to the fourth lens group G4 such that an interval between the first lens group G1 and the second lens group G2 increases, an interval between the second lens group G2 and the third lens group G3 decreases, an interval between the third lens group G3 and the fourth lens group G4 changes, and an interval between the fourth lens group G4 and the fifth lens group G5 changes upon zooming from the wide angle end state to the telephoto end state. Specifically, the first lens group G1 is moved to the object side, the second lens group G2 is moved to the image side, the third lens group G3 is moved to the object side, and the fourth lens group G4 is moved to the image side upon zooming. Note that the fifth lens group G5 is maintained to be stationary.

Values of specifications of an optical system according to Example 3 are indicated in Table 3 below.

TABLE 3

| [Lens specifications] | | | | |
|---|---|---|---|---|
| Surface number | R | D | nd | vd |
| 1 | 17.27752 | 0.22516 | 1.850260 | 32.35 |
| 2 | 8.24227 | 0.85326 | 1.497000 | 81.73 |
| 3 | −68.02316 | 0.02370 | 1.000000 | |
| 4 | 8.41690 | 0.62809 | 1.603000 | 65.44 |
| 5 | 69.25706 | D5(Variable) | | |
| *6 | 114.76917 | 0.11851 | 1.790630 | 45.01 |
| *7 | 1.54607 | 0.93384 | | |
| 8 | −3.62291 | 0.11851 | 1.834810 | 42.73 |
| 9 | 43.32976 | 0.02370 | | |
| 10 | 3.86387 | 0.51581 | 1.922860 | 20.87 |
| 11 | −6.04005 | 0.09955 | | |
| 12 | −3.37816 | 0.11851 | 1.785900 | 44.17 |
| 13 | 22.40315 | D13(Variable) | | |
| 14 | ∞ | 0.16591 | (Stop S) | |
| *15 | 1.61841 | 0.60377 | 1.618806 | 63.85 |
| *16 | −6.20745 | 0.02370 | | |
| 17 | 2.99653 | 0.45033 | 1.497000 | 81.73 |
| 18 | −5.12171 | 0.09481 | 1.881003 | 40.14 |
| 19 | 1.40762 | 0.07848 | | |
| 20 | 2.14473 | 0.46265 | 1.497000 | 81.73 |
| 21 | −4.27260 | D21(Variable) | | |
| 22 | 4.35903 | 0.16591 | 1.497103 | 81.56 |
| *23 | 1.73554 | D23(Variable) | | |
| *24 | 2.84164 | 0.47926 | 1.531100 | 56.14 |
| 25 | −29.19401 | 0.14221 | | |
| 26 | ∞ | 0.16828 | 1.516800 | 63.88 |
| 27 | ∞ | | | |

| [Aspherical surface data] | | | | | |
|---|---|---|---|---|---|
| | κ | A4 | A6 | A8 | A10 |
| Sixth surface | 0.00000 | 7.89275E−03 | −3.01708E−03 | 6.36519E−04 | −6.97691E−05 |
| Seventh surface | 0.00000 | 3.30991E−03 | 0.00000E+00 | 0.00000E+00 | 0.00000E+00 |
| Fifteenth surface | −0.34390 | −7.38987E−03 | −1.50897E−04 | 0.00000E+00 | 0.00000E+00 |
| Sixteenth surface | 0.00000 | 1.53603E−02 | −2.27791E−03 | 4.59659E−04 | 0.00000E+00 |
| Twenty-third surface | 0.00000 | −2.72857E−03 | 1.25833E−02 | −9.30300E−03 | 0.00000E+00 |
| Twenty-fourth surface | −0.67490 | −3.57076E−03 | 1.95051E−02 | 0.00000E+00 | 0.00000E+00 |

| | Wide | Middle | Tele |
|---|---|---|---|
| [Entire specifications] Zoom ratio 33.01367 | | | |
| f | 1.00000 | 5.91986 | 33.01367 |
| FNo | 3.44290 | 5.55406 | 7.18618 |
| ω | 44.50553 | 8.82866 | 1.62101 |
| TL | 15.92929 | 18.86334 | 23.29864 |
| Bf | 0.20146 | 0.20146 | 0.20146 |
| [Variable interval data] | | | |
| D5 | 0.16591 | 5.18302 | 9.42391 |
| D13 | 6.31044 | 1.76185 | 0.40293 |
| D21 | 0.35369 | 3.42225 | 3.43503 |
| D23 | 2.40383 | 1.80081 | 3.34136 |

TABLE 3-continued

[Lens group data]

| Group number | Group starting surface | Group focal length | Lens configuration length |
|---|---|---|---|
| G1 | 1 | 13.08327 | 1.73021 |
| G2 | 6 | −1.41938 | 1.92843 |
| G3 | 15 | 2.72764 | 1.87965 |
| G4 | 22 | −5.92539 | 0.16591 |
| G5 | 24 | 4.90132 | 0.78975 |

[Conditional expression corresponding value]

Conditional expressions (1) and (1A) $f1/(fw \times ft)^{1/2} = 2.277$
Conditional expressions (2) and (2A) $-f4/(fw \times ft)^{1/2} = 1.031$
Conditional expressions (3) and (3A) $-f5/f4 = 0.827$
Conditional expression (4) $-f2/fw = 1.419$
Conditional expressions (5) and (5A) $Dm4/(fw \times ft)^{1/2} = 0.163$
Conditional expression (6) $\omega w = 44.50553$
Conditional expression (7) $\omega t = 1.62101$ As indicated in the [Conditional expression corresponding value] table, the zoom lens ZL(3) according to Example 3 illustrated in FIG. 5 satisfies all the conditional expressions (1) to (7).

Figure 6C:
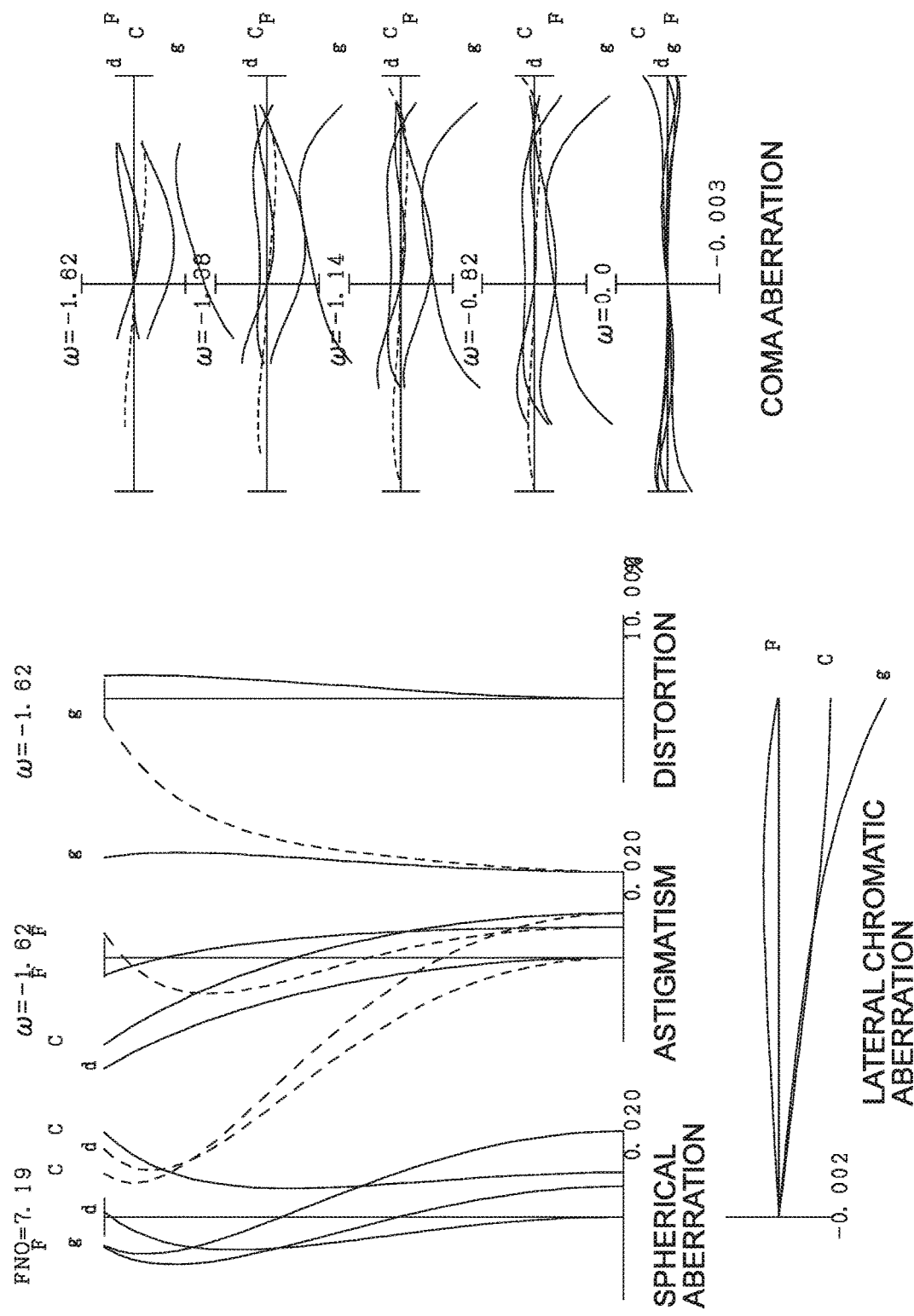

FIG. 6A, FIG. 6B, and FIG. 6C are various aberration graphs (spherical aberration graphs, astigmatism graphs, distortion graphs, coma aberration graphs, and lateral chromatic aberration graphs) of the zoom lens ZL(3) according to Example 3 in the wide angle end state, the intermediate focal length state, and the telephoto end state upon focusing on infinity. As can be seen from the various aberration graphs, the zoom lens ZL(3) according to Example 3 satisfactorily corrects various aberrations from the wide angle end state to the telephoto end state and has an excellent imaging performance.

Example 4

Example 4 is described with reference to FIG. 7, FIGS. 8A-8C, and Table 4. FIG. 7 is a view illustrating a lens configuration of the zoom lens ZL(4) according to Example 4 of this embodiment. The zoom lens ZL(4) comprises, in order from the object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The aperture stop S is disposed on the object side of the third lens group G3 and is configured to move with the third lens group G3 in the optical axis direction. The filter group FL is disposed between the fifth lens group G5 and the image surface I.

The first lens group G1 to the fourth lens group G4 are configured to move in the axial direction upon zooming as indicated by the arrows in FIG. 7. Therefore, the surface distances D5, D13, D21, and D23 are variable and values thereof are indicated in the [Variable interval data] table.

The first lens group G1 consists of, in order from the object, a cemented lens obtained by cementing a negative meniscus lens L11 having a concave surface facing the image side and a biconvex positive lens L12 and a positive meniscus lens L13 having a convex surface facing the object side.

The second lens group G2 consists of, in order from the object, a negative meniscus lens L21 having a concave surface facing the image side, a negative meniscus lens L22 having a concave surface facing the object side, a biconvex positive lens L23, and a biconcave negative lens L24. The negative meniscus lens L21 has a surface on the object side and a surface on the image side that are both aspherical surfaces.

The third lens group G3 consists of, in order from the object, a biconvex positive lens L31, a cemented lens obtained by cementing a biconvex positive lens L32 and a biconcave negative lens L33, and a biconvex positive lens L34. The biconvex positive lens L31 has a surface on the object side and a surface on the image side that are both aspherical surfaces.

The fourth lens group G4 consists of a negative meniscus lens L41 having a concave surface facing the image side. The negative meniscus lens L41 has a surface on the image side that is an aspherical surface.

The fifth lens group G5 consists of a positive meniscus lens L51 having a convex surface facing the object side. The positive meniscus lens L51 has a surface on the object side that is an aspherical surface.

In the zoom lens ZL(4), focusing from infinity (long distance object) to the short distance object is performed by moving the fourth lens group G4 in the image surface direction. In addition, all or at least a part of the third lens group G3 configures the vibration-proof lens group having a displacement component in a direction perpendicular to the optical axis and is configured to perform image blur correction (vibration proof and image shake correction) on the image surface I.

The zoom lens ZL(4) according to this example moves the first lens group G1 to the fourth lens group G4 such that an interval between the first lens group G1 and the second lens group G2 increases, an interval between the second lens group G2 and the third lens group G3 decreases, an interval between the third lens group G3 and the fourth lens group G4 changes, and an interval between the fourth lens group G4 and the fifth lens group G5 changes upon zooming from the wide angle end state to the telephoto end state. Specifically, the first lens group G1 is moved to the object side, the second lens group G2 is moved to the image side, the third lens group G3 is moved to the object side, and the fourth lens group is moved to the image side upon zooming. Note that the fifth lens group G5 is maintained to be stationary.

Values of specifications of an optical system according to Example 4 are indicated in Table 4 below.

TABLE 4

[Lens specifications]

| Surface number | R | D | nd | νd |
|---|---|---|---|---|
| 1 | 16.70322 | 0.22458 | 1.850260 | 32.35 |
| 2 | 8.14611 | 0.82738 | 1.497000 | 81.73 |
| 3 | −84.03805 | 0.02364 | | |
| 4 | 8.38065 | 0.62645 | 1.603000 | 65.44 |
| 5 | 68.95895 | D5(Variable) | | |
| *6 | 63.57118 | 0.11820 | 1.790630 | 44.98 |
| *7 | 1.54056 | 0.93140 | | |
| 8 | −3.04603 | 0.11820 | 1.834810 | 42.73 |
| 9 | −39.87200 | 0.02364 | | |
| 10 | 4.48765 | 0.50825 | 1.922860 | 20.88 |
| 11 | −5.31701 | 0.09929 | | |
| 12 | −3.16089 | 0.11820 | 1.785900 | 44.17 |
| 13 | 115.44226 | D13(Variable) | | |
| 14 | ∞ | 0.16548 | (Stop S) | |
| *15 | 1.58783 | 0.57917 | 1.618806 | 63.85 |
| *16 | −6.95530 | 0.02364 | | |
| 17 | 2.70168 | 0.41369 | 1.497000 | 81.73 |
| 18 | −6.50256 | 0.09456 | 1.881003 | 40.14 |
| 19 | 1.35782 | 0.09456 | | |
| 20 | 2.16368 | 0.46097 | 1.497000 | 81.73 |
| 21 | −4.45314 | D21(Variable) | | |
| 22 | 5.04296 | 0.16548 | 1.497000 | 81.73 |
| *23 | 1.77689 | D23(Variable) | | |
| *24 | 2.56283 | 0.49643 | 1.531100 | 55.90 |
| 25 | 47.27909 | 0.14184 | | |
| 26 | ∞ | 0.16784 | 1.516800 | 63.88 |
| 27 | ∞ | 0.20093 | | |

[Aspherical surface data]

| | κ | A4 | A6 | A8 | A10 |
|---|---|---|---|---|---|
| Sixth surface | 0.00000 | 2.81267E−03 | −2.34332E−04 | −7.72363E−05 | 6.22987E−06 |
| Seventh surface | 0.00000 | −2.80003E−03 | 0.00000E+00 | 0.00000E+00 | 0.00000E+00 |
| Fifteenth surface | −0.33620 | −6.93015E−03 | 0.00000E+00 | 0.00000E+00 | 0.00000E+00 |
| Sixteenth surface | 0.00000 | 1.51906E−02 | −1.52515E−03 | 4.59659E−04 | 0.00000E+00 |
| Twenty-third surface | 0.00000 | −2.35558E−04 | 6.55486E−04 | −9.30300E−03 | 0.00000E+00 |
| Twenty-fourth surface | 2.29230 | −8.46026E−03 | 0.00000E+00 | 0.00000E+00 | 0.00000E+00 |

| | Wide | Middle | Tele |
|---|---|---|---|
| [Entire specifications] Zoom ratio 32.96535 | | | |
| f | 1.00000 | 5.98080 | 32.96535 |
| FNo | 3.42015 | 5.34657 | 7.20300 |
| ω | 44.95510 | 8.72693 | 1.62031 |
| TL | 15.95433 | 18.77230 | 23.23767 |
| Bf | 0.20093 | 0.20094 | 0.20093 |
| [Variable interval data] | | | |
| D5 | 0.16548 | 5.36157 | 9.39664 |
| D13 | 6.38832 | 1.72210 | 0.40187 |
| D21 | 0.39352 | 3.44973 | 3.18905 |
| D23 | 2.38321 | 1.61509 | 3.62632 |

[Lens group data]

| Group number | Group starting surface | Group focal length | Lens configuration length |
|---|---|---|---|
| G1 | 1 | 13.07674 | 1.70205 |
| G2 | 6 | −1.43313 | 1.91717 |
| G3 | 15 | 2.72168 | 1.83206 |

TABLE 4-continued

| | | | |
|---|---|---|---|
| G4 | 22 | −5.61475 | 0.16548 |
| G5 | 24 | 5.08250 | 0.80611 |

[Conditional expression corresponding value]

Conditional expressions (1) and (1A) f1/(fw × ft)$^{1/2}$ = 2.278
Conditional expressions (2) and (2A) −f4/(fw × ft)$^{1/2}$ = 0.978
Conditional expressions (3) and (3A) −f5/f4 = 0.905
Conditional expression (4) −f2/fw = 1.433
Conditional expressions (5) and (5A) Dm4/(fw × ft)$^{1/2}$ = 0.217
Conditional expression (6) ωw = 44.95510
Conditional expression (7) ωt = 1.62031

As indicated in the [Conditional expression corresponding value] table, the zoom lens ZL(4) according to Example 4 illustrated in FIG. 7 satisfies all the conditional expressions (1) to (7).

Figure 8A:
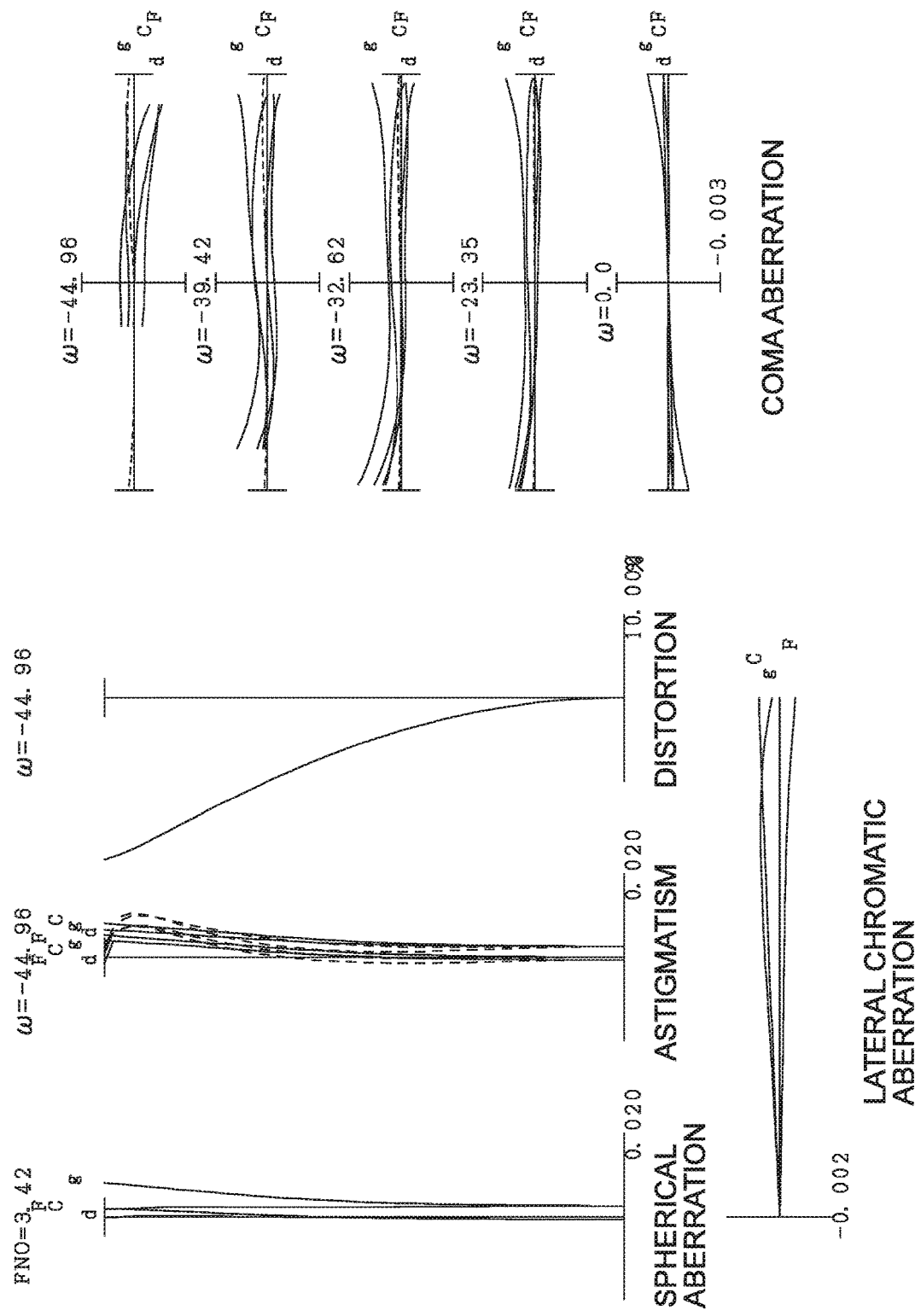
FIG. 8A, FIG. 8B, and FIG. 8C are various aberration graphs of the zoom lens according to Example 4 in a wide angle end state, an intermediate focal length state, and a telephoto end state.
Figure 8B:
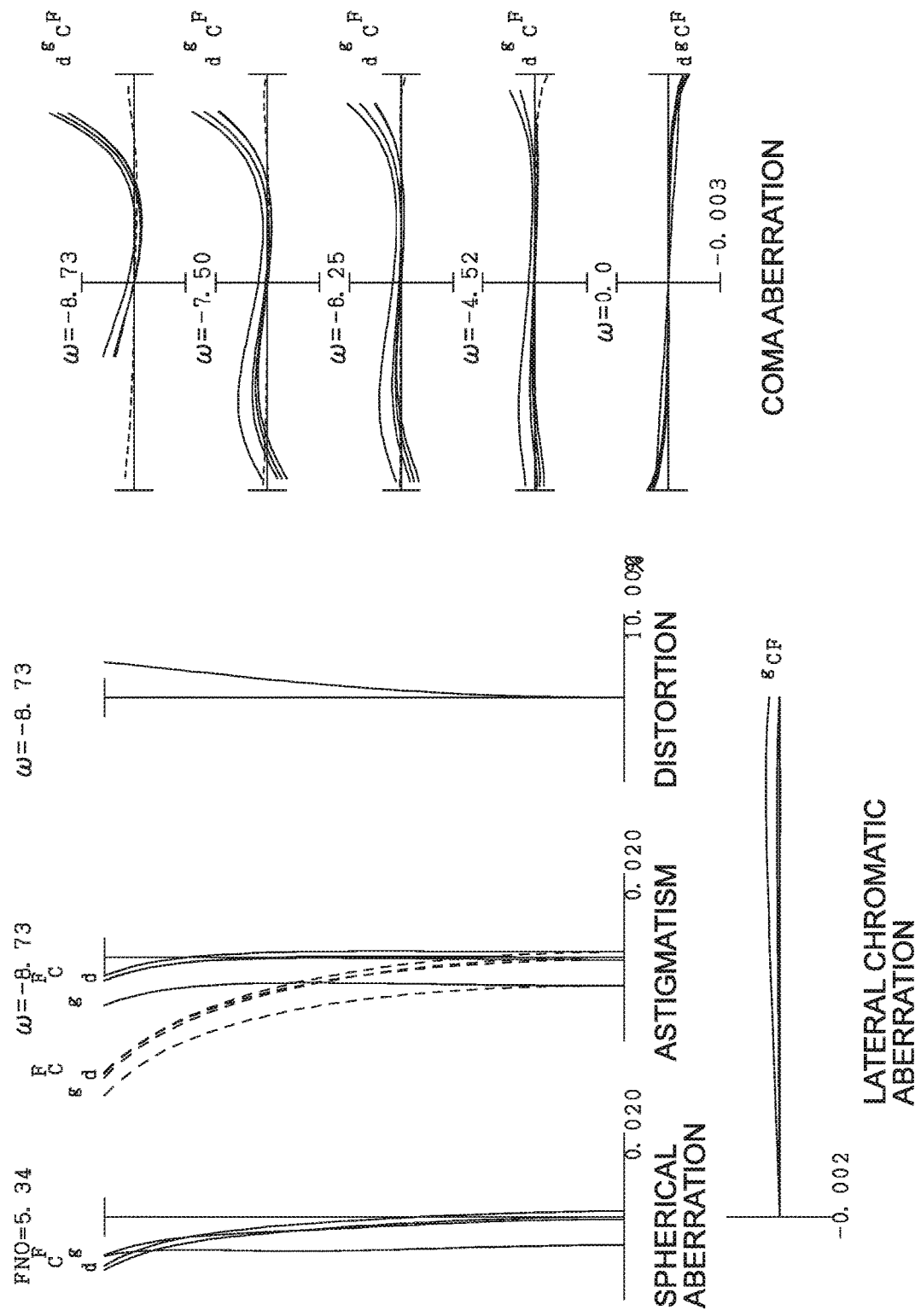
Figure 8C:
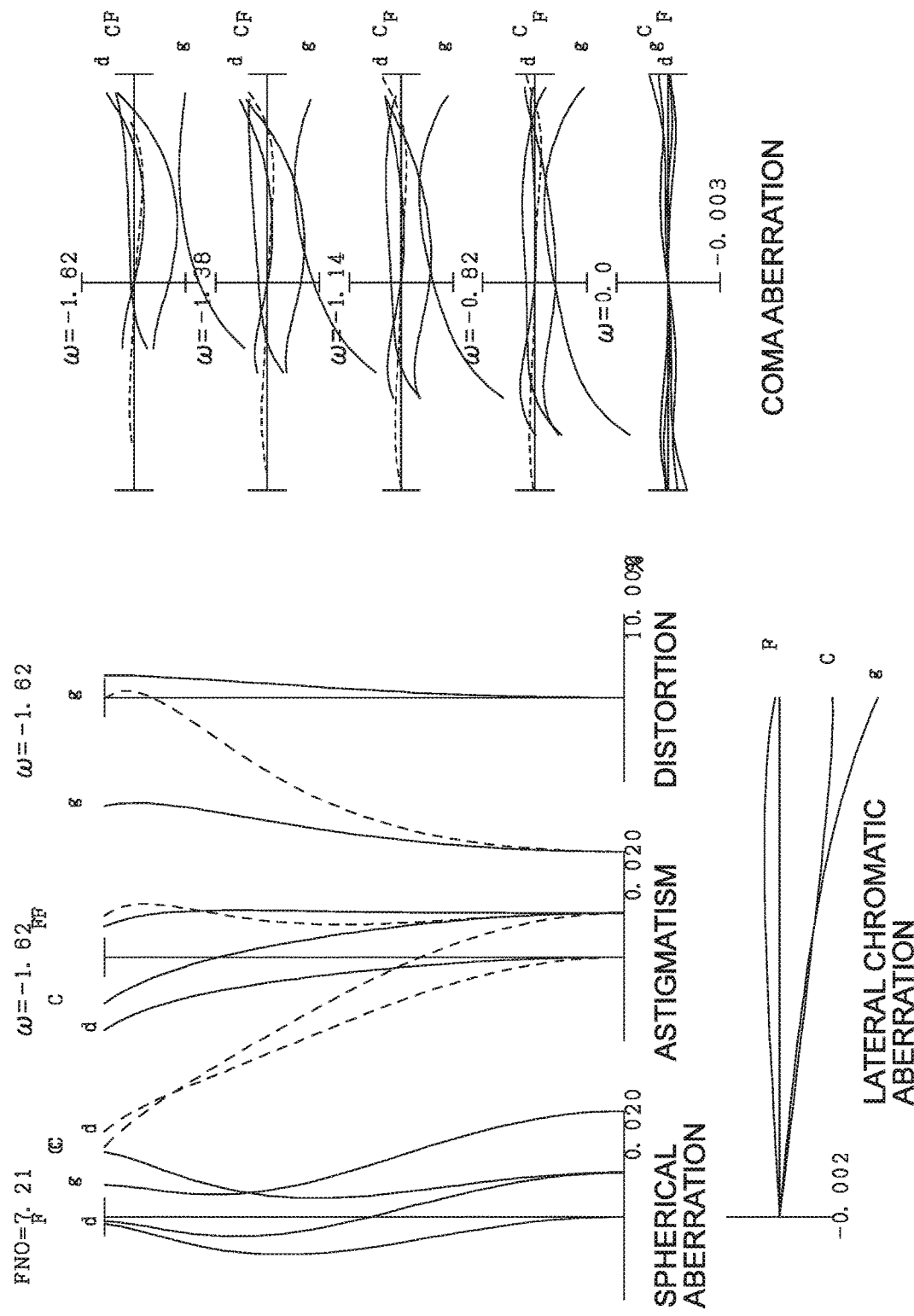

FIG. 8A, FIG. 8B, and FIG. 8C are various aberration graphs (spherical aberration graphs, astigmatism graphs, distortion graphs, coma aberration graphs, and lateral chromatic aberration graphs) of the zoom lens ZL(4) according to Example 4 in the wide angle end state, the intermediate focal length state, and the telephoto end state upon focusing on infinity. As can be seen from the various aberration graphs, the zoom lens ZL(4) according to Example 4 satisfactorily corrects various aberrations from the wide angle end state to the telephoto end state and has an excellent imaging performance.

Example 5

Example 5 is described with reference to FIG. 9, FIGS. 10A-10C, and Table 5. FIG. 9 is a view illustrating a lens configuration of the zoom lens ZL(5) according to Example 5 of this embodiment. The zoom lens ZL(5) comprises, in order from the object, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The aperture stop S is disposed on the object side of the third lens group G3 and is configured to move with the third lens group G3 in the optical axis direction. The filter group FL is disposed between the fifth lens group G5 and the image surface I.

The first lens group G1 to the fourth lens group G4 move in the axial direction upon zooming as indicated by the arrows in FIG. 9. Therefore, the surface distances D5, D11, D19 and D21 are variable and values thereof are indicated in the [Variable interval data] table.

The first lens group G1 consists of, in order from the object, a cemented lens obtained by cementing a negative meniscus lens L11 having a concave surface facing the image side and a positive meniscus lens L12 having a convex surface facing the object side and a positive meniscus lens L13 having a convex surface facing the object side.

The second lens group G2 consists of, in order from the object, a biconcave negative lens L21, a biconcave negative lens L22, and a positive meniscus lens L23 having a convex surface facing the object side. The biconcave negative lens L21 has a surface on the object side that is an aspherical surface.

The third lens group G3 consists of, in order from the object, a biconvex positive lens L31, a cemented lens obtained by cementing a biconvex positive lens L32 and a biconcave negative lens L33, and a biconvex positive lens L34. The biconvex positive lens L31 has a surface on the object side and a surface on the image side that are both aspherical surfaces.

The fourth lens group G4 consists of a negative meniscus lens L41 having a concave surface facing the image side. The negative meniscus lens L41 has a surface on the image side that is an aspherical surface.

The fifth lens group G5 consists of a biconvex positive lens L51. The positive lens L51 has a surface on the object side that is an aspherical surface.

In the zoom lens ZL(5), focusing from infinity (long distance object) to the short distance object is performed by moving the fourth lens group G4 in the image surface direction. In addition, all or at least a part of the third lens group G3 configures the vibration-proof lens group having a displacement component in a direction perpendicular to the optical axis and is configured to perform image blur correction (vibration proof and image shake correction) on the image surface I.

The zoom lens ZL(5) according to this example moves the first lens group G1 to the fourth lens group G4 such that an interval between the first lens group G1 and the second lens group G2 increases, an interval between the second lens group G2 and the third lens group G3 decreases, an interval between the third lens group G3 and the fourth lens group G4 changes, and an interval between the fourth lens group G4 and the fifth lens group G5 changes upon zooming from the wide angle end state to the telephoto end state. Specifically, the first lens group G1 is moved to the object side, the second lens group G2 is moved to the image side, the third lens group G3 is moved to the object side, and the fourth lens group G4 is moved to the image side upon zooming. Note that the fifth lens group G5 is maintained to be stationary.

Values of specifications of an optical system according to Example 5 are indicated in Table 5 below.

TABLE 5

[Lens specifications]

| Surface number | R | D | nd | vd |
|---|---|---|---|---|
| 1 | 12.48687 | 0.21440 | 1.850260 | 32.35 |
| 2 | 6.20885 | 0.74474 | 1.497000 | 81.73 |

TABLE 5-continued

| | | | | |
|---|---|---|---|---|
| 3 | 895.84648 | 0.02257 | | |
| 4 | 7.23066 | 0.57548 | 1.603110 | 60.69 |
| 5 | 296.15291 | D5(Variable) | | |
| *6 | −59.44010 | 0.13541 | 1.743300 | 49.26 |
| 7 | 1.40642 | 0.86210 | | |
| 8 | −3.11726 | 0.12412 | 1.772500 | 49.62 |
| 9 | 9.19918 | 0.04514 | | |
| 10 | 3.73558 | 0.36109 | 1.945950 | 17.98 |
| 11 | 41.38655 | D11(Variable) | | |
| 12 | ∞ | 0.15798 | (Stop S) | |
| *13 | 1.69538 | 0.49650 | 1.592010 | 67.05 |
| *14 | −7.40012 | 0.02257 | | |
| 15 | 1.43543 | 0.45136 | 1.497000 | 81.73 |
| 16 | −17.71365 | 0.09027 | 1.881000 | 40.15 |
| 17 | 1.18114 | 0.15798 | | |
| 18 | 3.80264 | 0.33852 | 1.497000 | 81.73 |
| 19 | −4.73674 | D19(Variable) | | |
| 20 | 4.51978 | 0.15798 | 1.497100 | 81.49 |
| *21 | 1.67590 | D21(Variable) | | |
| *22 | 2.36964 | 0.55292 | 1.531100 | 55.91 |
| 23 | −14.37779 | 0.13992 | | |
| 24 | ∞ | 0.18054 | 1.516800 | 63.88 |
| 25 | ∞ | | | |

[Aspherical surface data]

| | κ | A4 | A6 | A8 | A10 |
|---|---|---|---|---|---|
| Sixth surface | 0.00000 | 1.53111E−03 | −5.29962E−04 | 2.79967E−05 | 0.00000E+00 |
| Thirteenth surface | 0.03530 | −9.40131E−03 | 0.00000E+00 | 0.00000E+00 | 0.00000E+00 |
| Fourteenth surface | 0.00000 | 1.66370E−02 | 1.70818E−03 | 0.00000E+00 | 0.00000E+00 |
| Twenty-first surface | 0.00000 | −7.27088E−05 | 0.00000E+00 | 0.00000E+00 | 0.00000E+00 |
| Twenty-second surface | 1.69840 | −4.38768E−03 | 0.00000E+00 | 0.00000E+00 | 0.00000E+00 |

| | Wide | Middle | Tele |
|---|---|---|---|

[Entire specifications]
Zoom ratio 28.14298

| | | | |
|---|---|---|---|
| f | 1.00000 | 5.26819 | 28.14298 |
| FNo | 3.49292 | 5.24406 | 7.19777 |
| ω | 43.27155 | 9.43590 | 1.82423 |
| TL | 15.16451 | 16.49611 | 20.17095 |
| Bf | 0.19184 | 0.19219 | 0.19194 |

[Variable interval data]

| | | | |
|---|---|---|---|
| D5 | 0.16238 | 4.14650 | 7.53733 |
| D11 | 6.44128 | 1.86580 | 0.38271 |
| D19 | 0.34196 | 3.11922 | 2.51099 |
| D21 | 2.19548 | 1.34083 | 3.71641 |

[Lens group data]

| Group number | Group starting surface | Group focal length | Lens configuration length |
|---|---|---|---|
| G1 | 1 | 10.94022 | 1.55719 |
| G2 | 6 | −1.48579 | 1.52785 |
| G3 | 13 | 2.67403 | 1.71517 |
| G4 | 20 | −5.45875 | 0.15798 |
| G5 | 22 | 3.87483 | 0.87338 |

[Conditional expression corresponding value]

Conditional expressions (1) and (1A) $f1/(fw \times ft)^{1/2} = 2.062$
Conditional expressions (2) and (2A) $-f4/(fw \times ft)^{1/2} = 1.029$
Conditional expressions (3) and (3A) $-f5/f4 = 0.710$
Conditional expression (4) $-f2/fw = 1.486$
Conditional expressions (5) and (5A) $Dm4/(fw \times ft)^{1/2} = 0.287$
Conditional expression (6) $\omega w = 43.27155$
Conditional expression (7) $\omega t = 1.82423$ As indicated in the [Conditional expression corresponding value] table, the zoom lens ZL(5) according to Example 5 illustrated in FIG. 9 satisfies all the conditional expressions (1) to (7).

Figure 10A:
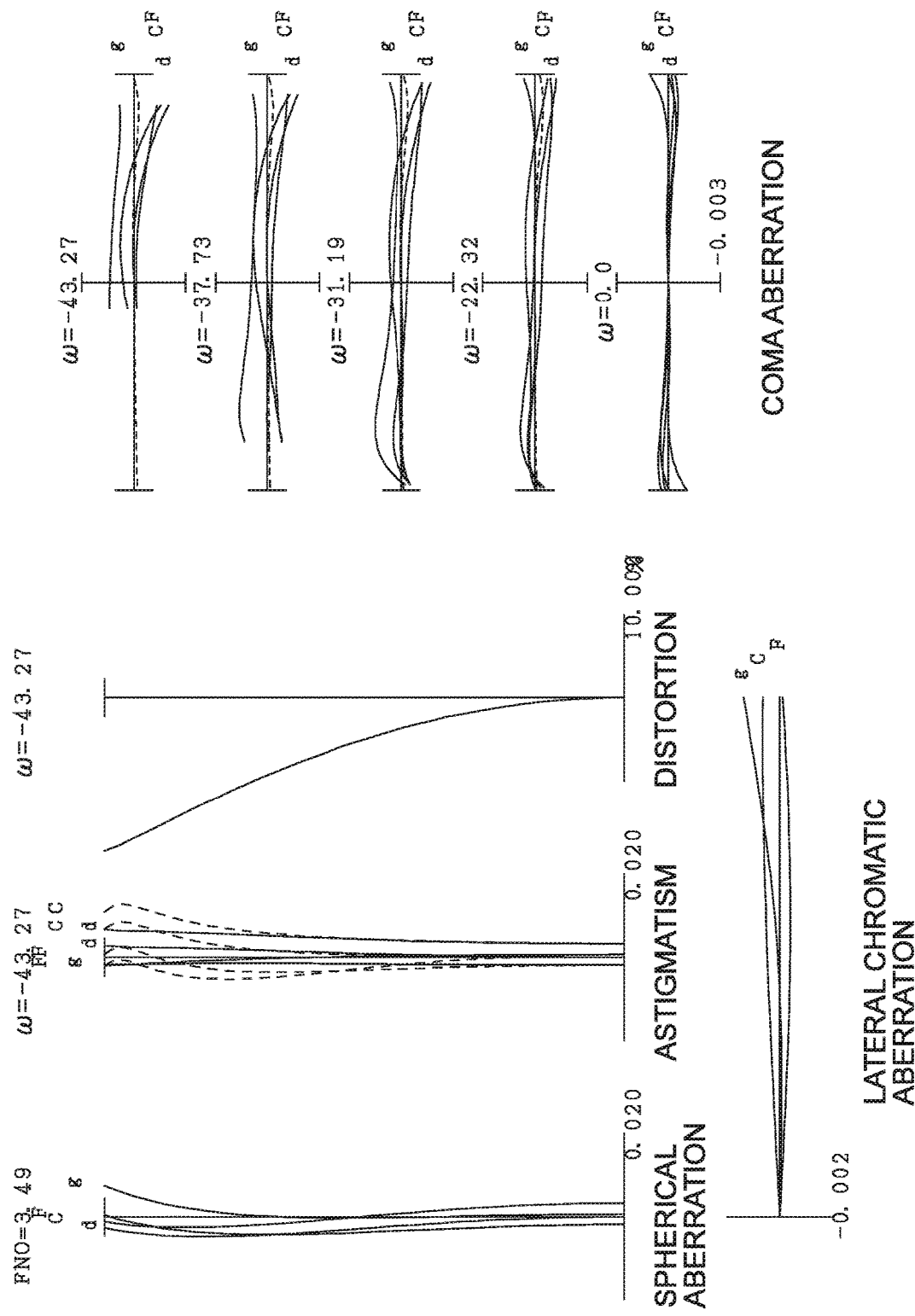
Figure 10C:
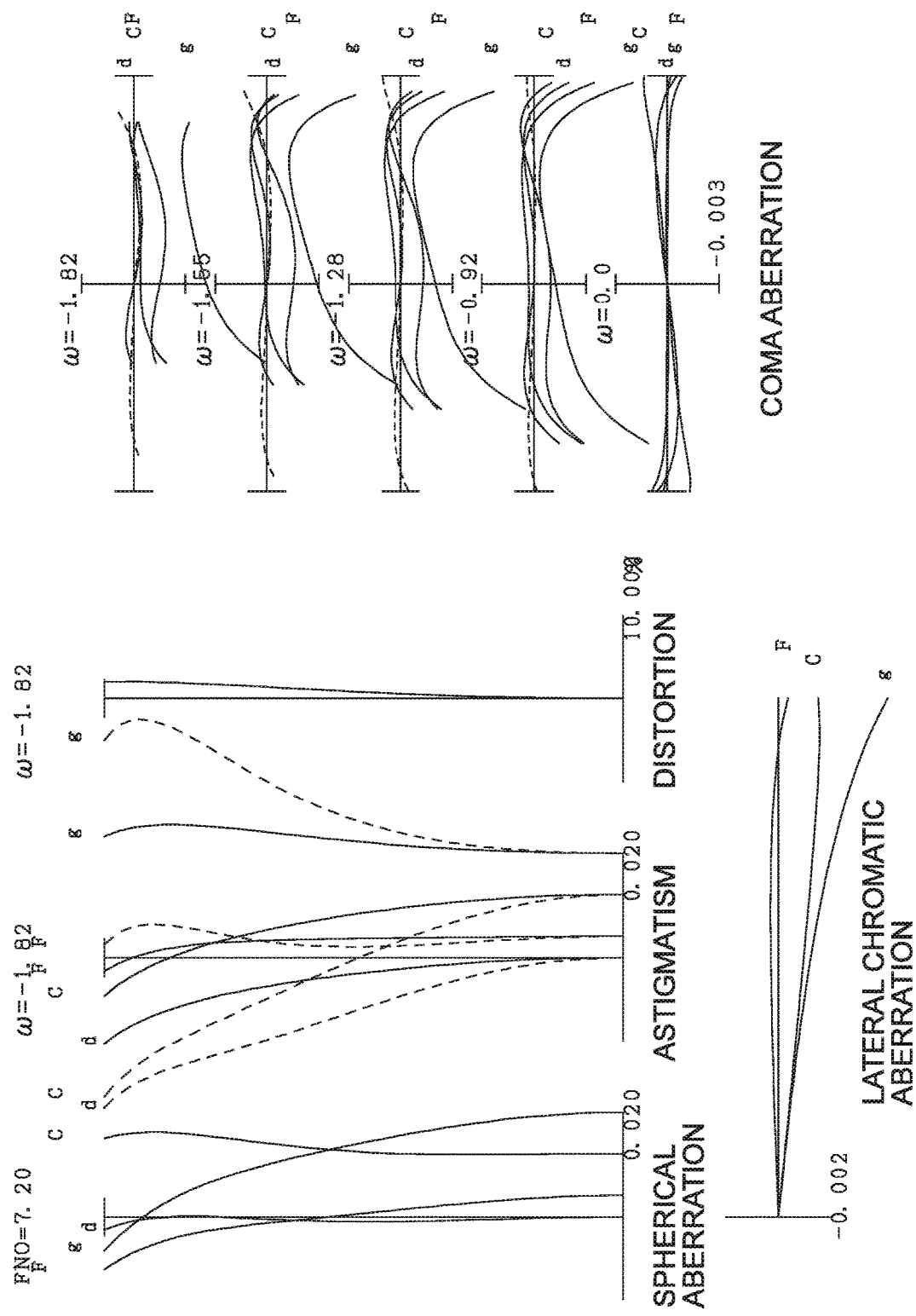

FIG. 10A, FIG. 10B, and FIG. 10C are various aberration graphs (spherical aberration graphs, astigmatism graphs, distortion graphs, coma aberration graphs, and lateral chromatic aberration graphs) of the zoom lens ZL(5) according to Example 5 in the wide angle end state, the intermediate focal length state, and the telephoto end state upon focusing on infinity. As can be seen from the various aberration graphs, the zoom lens ZL(5) according to Example 5 satisfactorily corrects various aberrations from the wide angle end state to the telephoto end state and has an excellent imaging performance.

Each example above describes a specific example of the present invention, and the present invention is not limited thereto.

The content below can be employed, as appropriate, within a range in which the optical performance of the zoom lens of this embodiment is not impaired.

A five-group configuration has been described as an example of the zoom lens of this embodiment, but this application is not limited thereto, and a zoom lens can have other group configurations (for example, a six-group configuration and the like). Specifically, a lens or a lens group may be added to a place in the zoom lens of this embodiment that is closest to the object or closest to the image surface. Note that the lens groups mean parts each including at least one lens that are separated from each other by a distance that changes upon zooming.

A single lens group, a plurality of lens groups, or a sub lens group may be moved in the optical axis direction so as to serve as a focus lens group that performs focusing from an infinite distant object to a short distance object. The focus lens group can also be applied to auto focus and is also suitable for motor drive for auto focus (using ultrasonic motor and the like).

A lens group or a sub lens group may be moved to have a component in a direction perpendicular to the optical axis or rotated (oscillated) in an in-plane direction including the optical axis so as to serve as a vibration-proof lens group that corrects image blur caused by image shake.

The lens surface may be formed by a spherical surface or a flat surface or may be formed by an aspherical surface. It is preferred that the lens surface be a spherical surface or a flat surface because lens processing and assembly adjustment becomes easier and deterioration in optical performance caused by an error due to the processing or the assembly adjustment can be prevented. In addition, it is preferred that the lens surface be a spherical surface or a flat surface because deterioration in imaging performance is small even if the image surface is out of alignment.

When the lens surface is an aspherical surface, the aspherical surface may be any one of an aspherical surface obtained by grinding processing, a glass-mold aspherical surface obtained by forming glass into a shape of an aspherical surface by a mold, or a composite type aspherical surface obtained by forming a resin having a shape of an aspherical surface on a glass surface. In addition, the lens surface may be a diffractive surface and the lens may be a gradient index lenses (GRIN lens) or a plastic lens.

It is preferred that the aperture stop be disposed in the neighborhood of the third lens group or in the third lens group, but a member serving as an aperture stop does not need to be provided and a lens rim may serve as an aperture stop instead.

An antireflection film having high transmissivity in a wide wavelength range may be applied to each lens surface in order to reduce a flare or a ghost and attain a high-contrast optical performance.

| EXPLANATION OF NUMERALS AND CHARACTERS | | | |
|---|---|---|---|
| G1 | First lens group | G2 | Second lens group |
| G3 | Third lens group | G4 | Fourth lens group |
| G5 | Fifth lens group | FL | Filter group |
| I | Image surface | S | Aperture stop |

The invention claimed is:

1. A zoom lens, comprising, in order from an object:
a first lens group having a positive refractive power;
a second lens group having a negative refractive power;
a third lens group having a positive refractive power;
a fourth lens group having a negative refractive power; and
a fifth lens group having a positive refractive power, wherein:
intervals between adjacent lens groups change and the first lens group, the second lens group, the third lens group, and the fourth lens group move upon zooming from a wide angle end state to a telephoto end state; and
following conditional expressions are satisfied:

$$1.80 < f1/(fw \times ft)^{1/2} < 2.60; \text{ and}$$

$$0.75 < -f4/(fw \times ft)^{1/2} < 1.20,$$

where, f1 denotes a focal length of the first lens group,
f4 denotes a focal length of the fourth lens group,
fw denotes a focal length of the zoom lens in the wide angle end state, and
ft denotes a focal length of the zoom lens in the telephoto end state.

2. The zoom lens according to claim 1, wherein a following conditional expression is satisfied:

$$0.50 < -f5/f4 < 1.30,$$

where, f5 denotes a focal length of the fifth lens group.

3. The zoom lens according to claim 1, wherein a following conditional expression is satisfied:

$$0.05 < Dm4/(fw \times ft)^{1/2} < 0.40,$$

where, Dm4 denotes a difference in position of the fourth lens group between the wide angle end state and the telephoto end state on an optical axis (displacement toward the object is positive).

4. The zoom lens according to claim 1, wherein the fifth lens group is stationary upon zooming from the wide angle end state to the telephoto end state.

5. The zoom lens according to claim 1, wherein an interval between the first lens group and the second lens group increases and an interval between the second lens group and the third lens group decreases upon zooming from the wide angle end state to the telephoto end state.

6. The zoom lens according to claim 1, wherein a following conditional expression is satisfied:

$$1.20 < -f2/fw < 1.60,$$

where, f2 denotes a focal length of the second lens group.

7. The zoom lens according to claim 1, wherein a following conditional expression is satisfied:

$$15.0 < \omega w < 65.0,$$

where, ωw denotes a half angle of view (unit: degree) of an entirety of the zoom lens in the wide angle end state.

8. The zoom lens according to claim 1, wherein a following conditional expression is satisfied:

$$0.5<\omega t<7.0,$$

where, ωt denotes a half angle of view (unit: degree) of an entirety of the zoom lens in the telephoto end state.

9. The zoom lens according to claim 1, wherein the third lens group includes at least one aspheric lens.

10. The zoom lens according to claim 1, wherein at least a part of the fourth lens group is a focus lens.

11. The zoom lens according to claim 1, wherein at least a part of the third lens group has a displacement component in a direction perpendicular to the optical axis.

12. An optical apparatus comprising the zoom lens according to claim 1.

13. A zoom lens, comprising, in order from an object:
a first lens group having a positive refractive power;
a second lens group having a negative refractive power;
a third lens group having a positive refractive power;
a fourth lens group having a negative refractive power; and
a fifth lens group having a positive refractive power, wherein:
intervals between adjacent lens groups change and the first lens group, the second lens group, the third lens group, and the fourth lens group move upon zooming from a wide angle end state to a telephoto end state; and
following conditional expressions are satisfied:

$$1.80<f1/(fw \times ft)^{1/2}<2.40; \text{ and}$$

$$0.50<-f5/f4<1.00,$$

where, f1 denotes a focal length of the first lens group,
f4 denotes a focal length of the fourth lens group,
f5 denotes a focal length of the fifth lens group,
fw denotes a focal length of the zoom lens in the wide angle end state, and
ft denotes a focal length of the zoom lens in the telephoto end state.

14. The zoom lens according to claim 13, wherein a following conditional expression is satisfied:

$$0.05<Dm4/(fw \times ft)^{1/2}<0.40,$$

where, Dm4 denotes a difference in position of the fourth lens group between the wide angle end state and the telephoto end state on an optical axis (displacement toward the object is positive).

15. The zoom lens according to claim 13, wherein the fifth lens group is stationary upon zooming from the wide angle end state to the telephoto end state.

16. The zoom lens according to claim 13, wherein a following conditional expression is satisfied:

$$1.20<-f2/fw<1.60,$$

where, f2 denotes a focal length of the second lens group.

17. The zoom lens according to claim 13, wherein at least a part of the fourth lens group is a focus lens.

18. An optical apparatus comprising the zoom lens according to claim 13.

19. A zoom lens, comprising, in order from an object,
a first lens group having a positive refractive power;
a second lens group having a negative refractive power;
a third lens group having a positive refractive power;
a fourth lens group having a negative refractive power; and
a fifth lens group having a positive refractive power, wherein:
intervals between adjacent lens groups change and the first lens group, the second lens group, the third lens group, and the fourth lens group move upon zooming from a wide angle end state to a telephoto end state; and
following conditional expressions are satisfied:

$$0.86<-f4/(fw \times ft)^{1/2}<1.18; \text{ and}$$

$$0.10<Dm4/(fw \times ft)^{1/2}<0.30,$$

where, f4 denotes a focal length of the fourth lens group,
Dm4 denotes a difference in position of the fourth lens group between the wide angle end state and the telephoto end state on an optical axis (displacement toward the object is positive),
fw denotes a focal length of the zoom lens in the wide angle end state, and
ft denotes a focal length of the zoom lens in the telephoto end state.

20. The zoom lens according to claim 19, wherein a following conditional expression is satisfied:

$$0.50<-f5/f4<1.30,$$

where, f5 denotes a focal length of the fifth lens group.

21. The zoom lens according to claim 19, wherein the fifth lens group is stationary upon zooming from the wide angle end state to the telephoto end state.

22. The zoom lens according to claim 19, wherein a following conditional expression is satisfied:

$$1.20<-f2/fw<1.60,$$

where, f2 denotes a focal length of the second lens group.

23. The zoom lens according to claim 19, wherein at least a part of the fourth lens group is a focus lens.

24. An optical apparatus comprising the zoom lens according to claim 19.

25. A method for manufacturing a zoom lens,
the zoom lens comprising, in order from an object:
a first lens group having a positive refractive power;
a second lens group having a negative refractive power;
a third lens group having a positive refractive power;
a fourth lens group having a negative refractive power; and
a fifth lens group having a positive refractive power,
the method comprising:
disposing the first lens group to the fifth lens group in a lens barrel such that intervals between adjacent lens groups are changed and the first lens group, the second lens group, the third lens group, and the fourth lens group move upon zooming from a wide angle end state to a telephoto end state, and
one of the following steps (A), (B) and (C):
(A): satisfying the following conditional expressions:

$$1.80<f1/(fw \times ft)^{1/2}<2.60; \text{ and}$$

$$0.75<-f4/(fw \times ft)^{1/2}<1.20,$$

where, f1 denotes a focal length of the first lens group,
f4 denotes a focal length of the fourth lens group,
fw denotes a focal length of the zoom lens in the wide angle end state, and
ft denotes a focal length of the zoom lens in the telephoto end state,
(B): satisfying the following conditional expressions:

$$1.80<f1/(fw \times ft)^{1/2}<2.40; \text{ and}$$

$$0.50<-f5/f4<1.00,$$

where, f5 denotes a focal length of the fifth lens group, and (C): satisfying the following conditional expressions:

$$0.86 < -f4/(fw \times ft)^{1/2} < 1.18; \text{ and}$$

$$0.10 < Dm4/(fw \times ft)^{1/2} < 0.30,$$

where, Dm4 denotes a difference in position of the fourth lens group between the wide angle end state and the telephoto end state on an optical axis (displacement toward the object is positive).

* * * * *